(12) United States Patent
Kanno

(10) Patent No.: US 11,385,800 B2
(45) Date of Patent: Jul. 12, 2022

(54) INFORMATION PROCESSING SYSTEM FOR CONTROLLING STORAGE DEVICE

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 61 days.

(21) Appl. No.: 16/353,274

(22) Filed: Mar. 14, 2019

(65) Prior Publication Data

US 2020/0042200 A1 Feb. 6, 2020

(30) Foreign Application Priority Data

Jul. 31, 2018 (JP) .............................. JP2018-143750

(51) Int. Cl.
*G06F 3/06* (2006.01)
*G06F 11/10* (2006.01)
*G06F 12/02* (2006.01)

(52) U.S. Cl.
CPC .......... *G06F 3/0619* (2013.01); *G06F 3/0649* (2013.01); *G06F 3/0688* (2013.01); *G06F 11/1044* (2013.01); *G06F 12/0292* (2013.01)

(58) Field of Classification Search
CPC .... G06F 3/0619; G06F 3/0649; G06F 3/0688; G06F 11/1044; G06F 12/0292
USPC ....................................................... 711/162
See application file for complete search history.

(56) References Cited

U.S. PATENT DOCUMENTS

| | | | |
|---|---|---|---|
| 9,870,159 B2 | 1/2018 | Cepulis | |
| 9,936,024 B2 | 4/2018 | Malwankar et al. | |
| 10,365,982 B1* | 7/2019 | Brooks | G06F 3/0632 |
| 2010/0217918 A1* | 8/2010 | Chen | G06F 12/0246 711/103 |
| 2012/0268994 A1* | 10/2012 | Nagashima | G11C 16/34 365/185.11 |
| 2014/0207997 A1* | 7/2014 | Peterson | G06F 12/0246 711/103 |
| 2016/0011818 A1 | 1/2016 | Hashimoto et al. | |
| 2016/0077933 A1* | 3/2016 | Ventura | G06F 11/2023 714/4.1 |
| 2016/0188424 A1* | 6/2016 | Walls | G06F 11/2064 714/6.3 |
| 2016/0283327 A1 | 9/2016 | Frost et al. | |

(Continued)

FOREIGN PATENT DOCUMENTS

| | | |
|---|---|---|
| JP | 2014-182503 | 9/2014 |
| JP | 2017-174250 | 9/2017 |
| JP | 2017-199043 | 11/2017 |

*Primary Examiner* — Gautam Sain

(74) *Attorney, Agent, or Firm* — Oblon, McClelland, Maier & Neustadt, L.L.P.

(57) ABSTRACT

According to one embodiment, when it is determined that a first storage device of a plurality of storage devices is to be removed and an additional storage device is connected to a storage controller, the storage controller writes update data portions corresponding to data portions already written to the first storage device to any storage device selected from remaining one or more storage devices of the plurality of storage devices except for the first storage device and the additional storage device. Further, the storage controller writes update data portions corresponding to data portions already written to the remaining one or more storage devices to any storage device selected from the remaining one or more storage devices and the additional storage device.

16 Claims, 18 Drawing Sheets

(56) References Cited

U.S. PATENT DOCUMENTS

2017/0168929 A1* 6/2017 Kanno ................. G06F 3/0647
2017/0177235 A1* 6/2017 Nishikubo ............ G06F 3/0611
2017/0286291 A1* 10/2017 Thomas ............. G06F 12/0253
2017/0286311 A1* 10/2017 Juenemann ........... G06F 12/023
2018/0024946 A1* 1/2018 Kapinos ................ G06F 3/0619
710/18

* cited by examiner

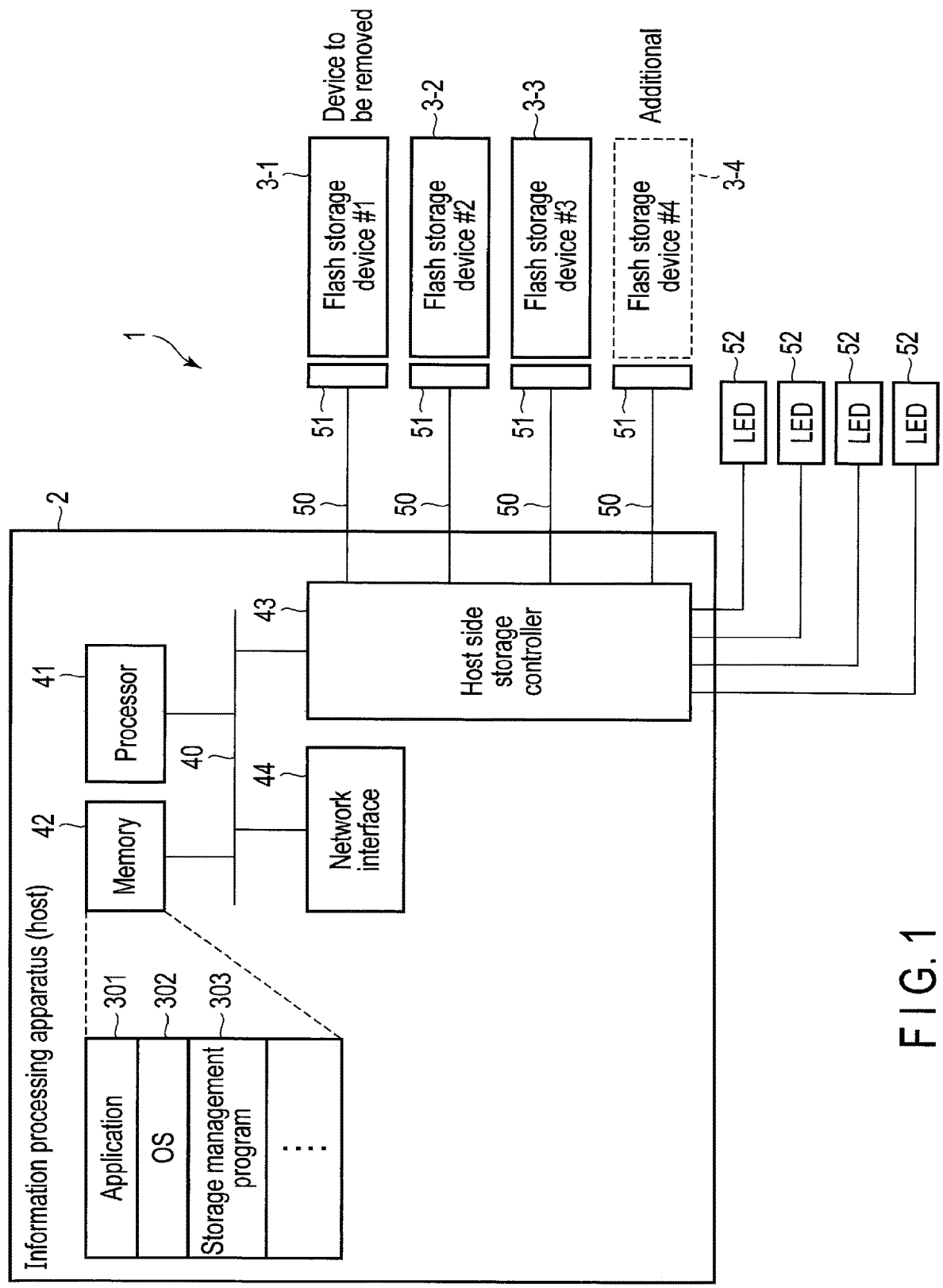
F I G. 1

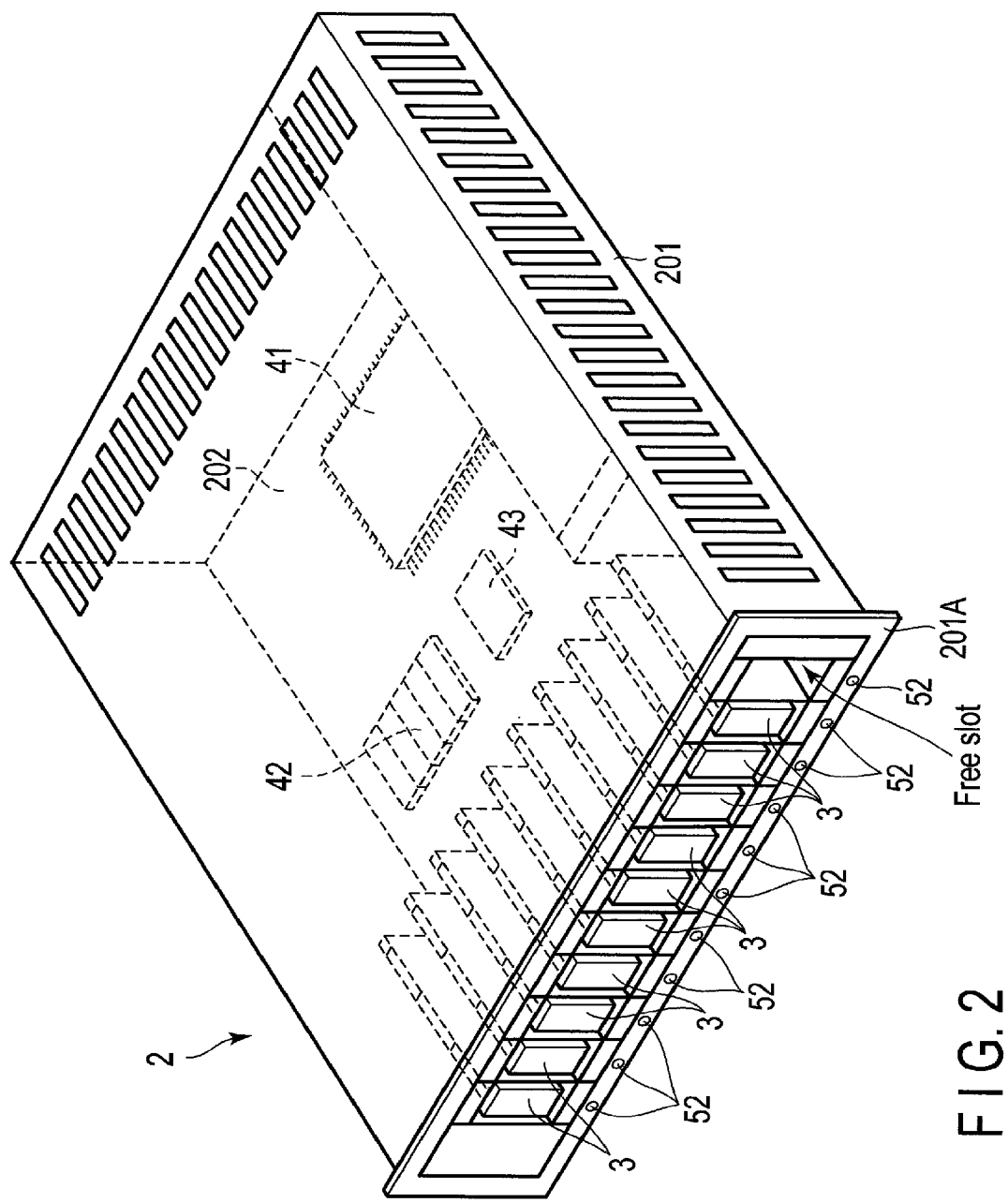
F I G. 2

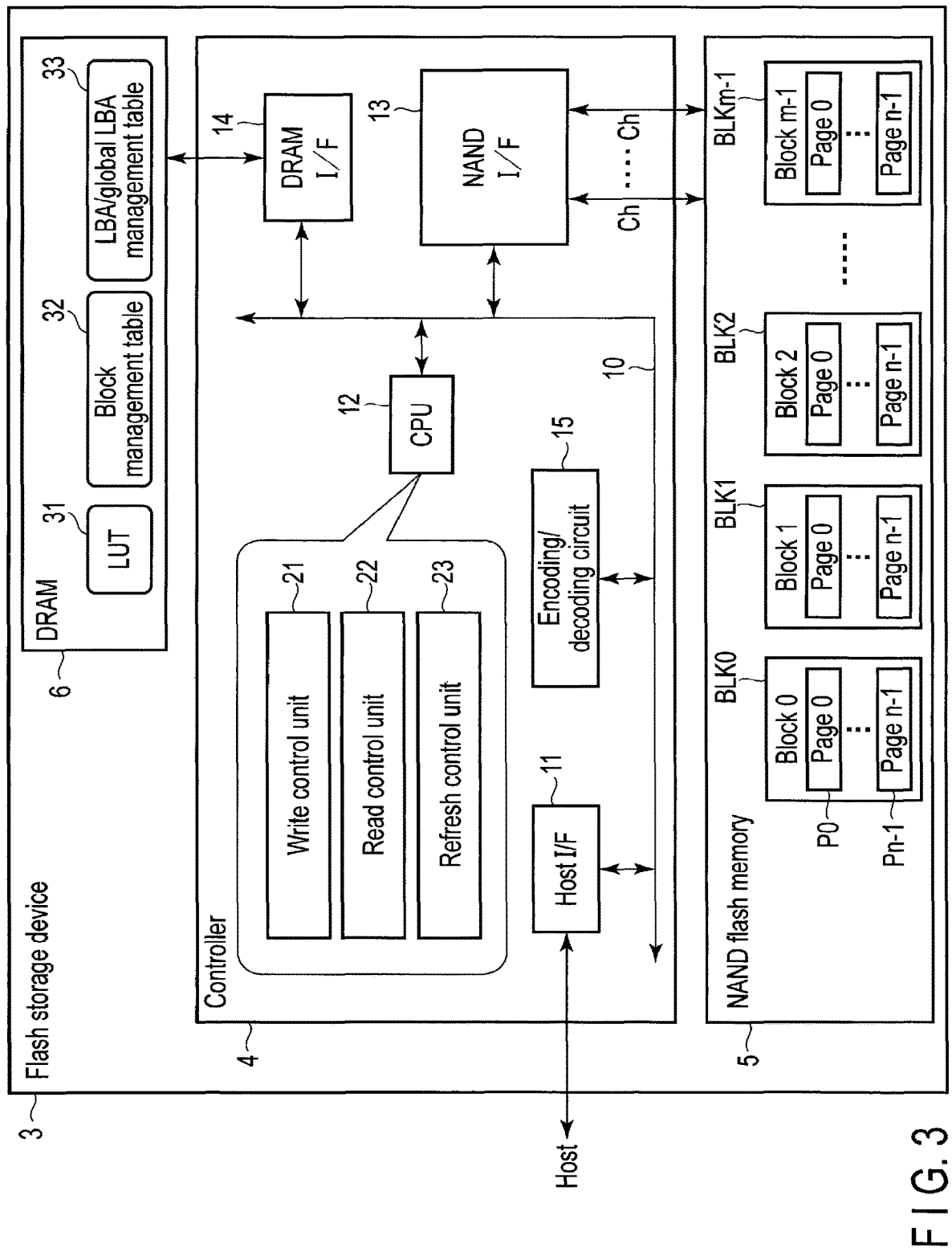
F I G. 3

LUT

| LBA 0 | PBA | ~31 |
|---|---|---|
| 1 | PBA | |
| 2 | PBA | |
| | ⋮ | |
| X | PBA | |

F I G. 4

LBA/global LBA management table

| LBA 0 | Global LBA | ~33 |
|---|---|---|
| 1 | Global LBA | |
| 2 | Global LBA | |
| | ⋮ | |
| X | Global LBA | |

F I G. 5

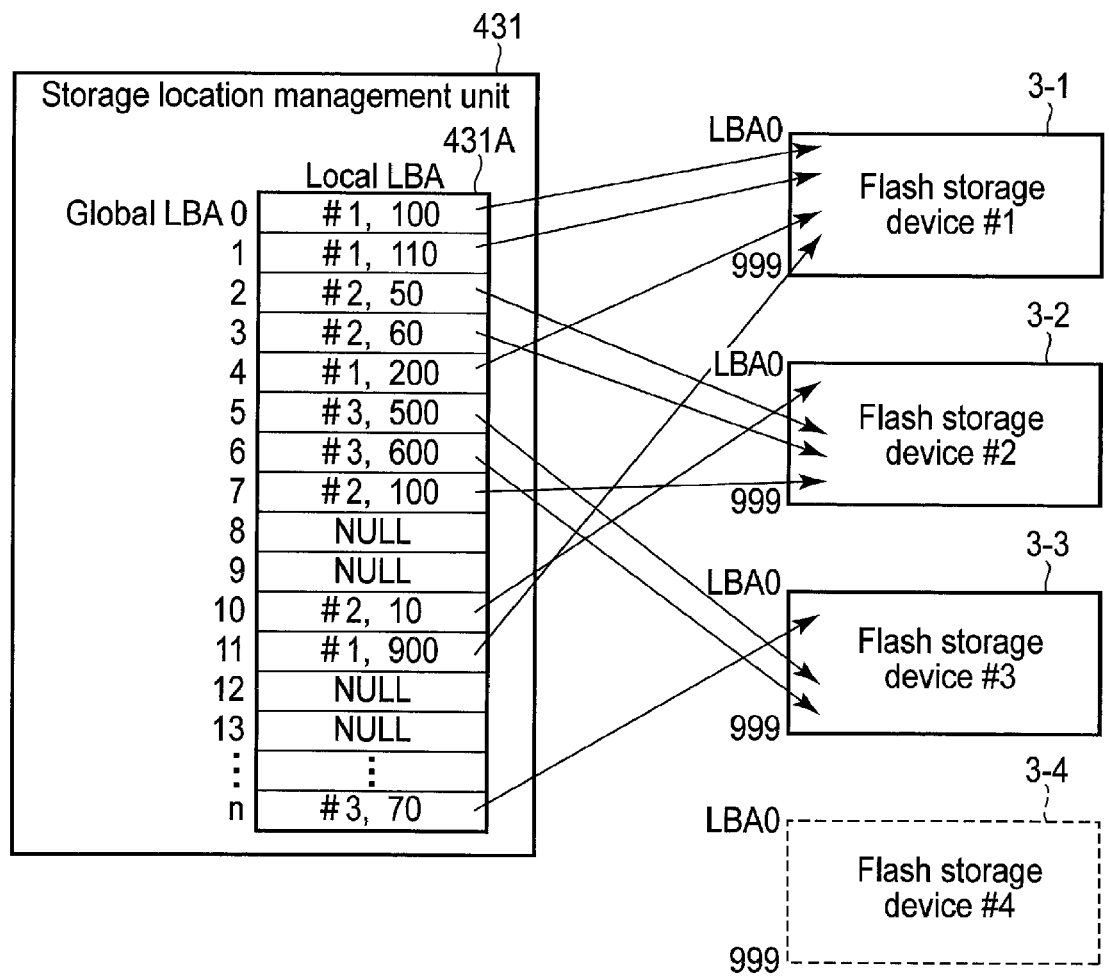
F I G. 9

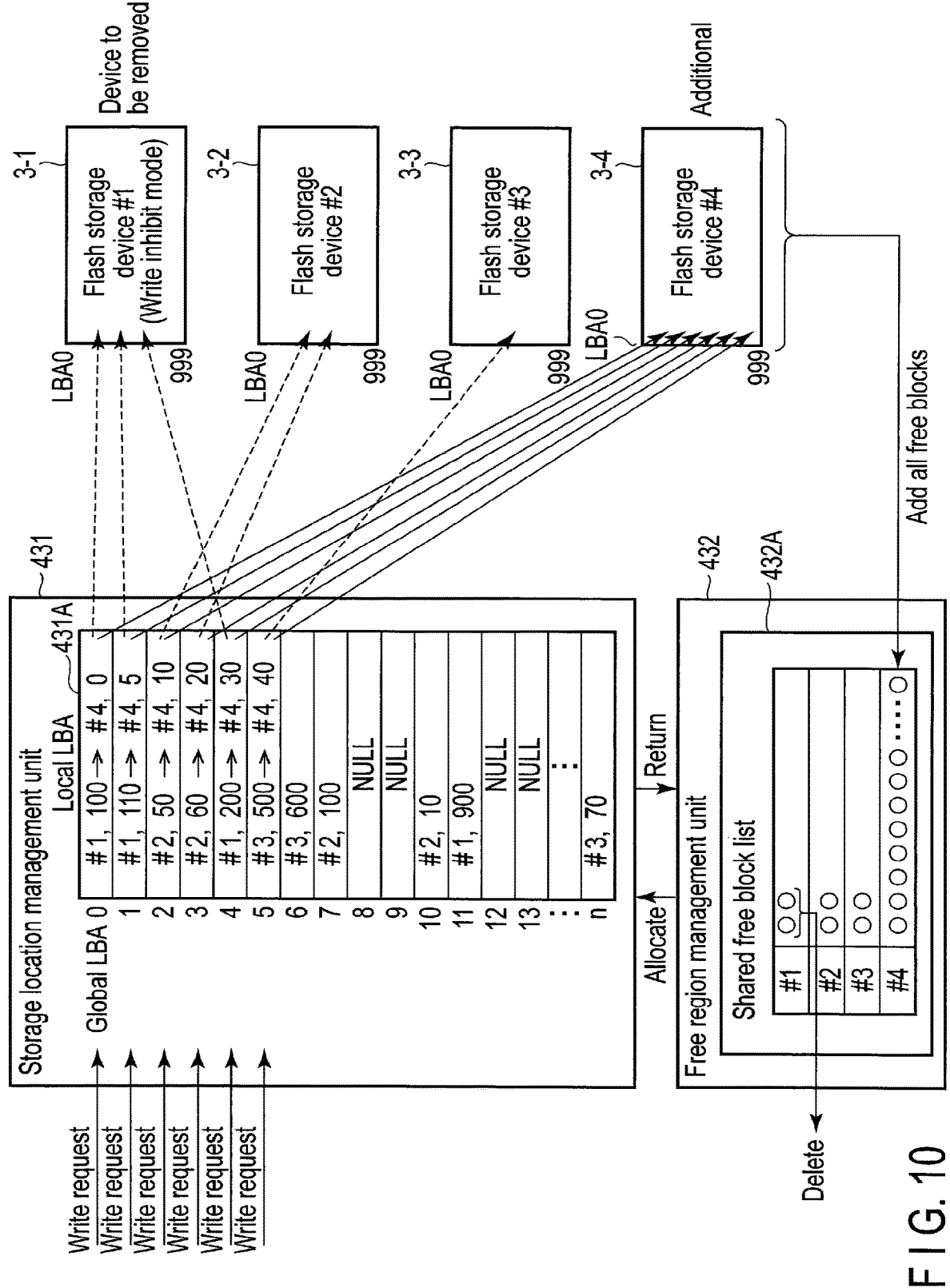
F I G. 10

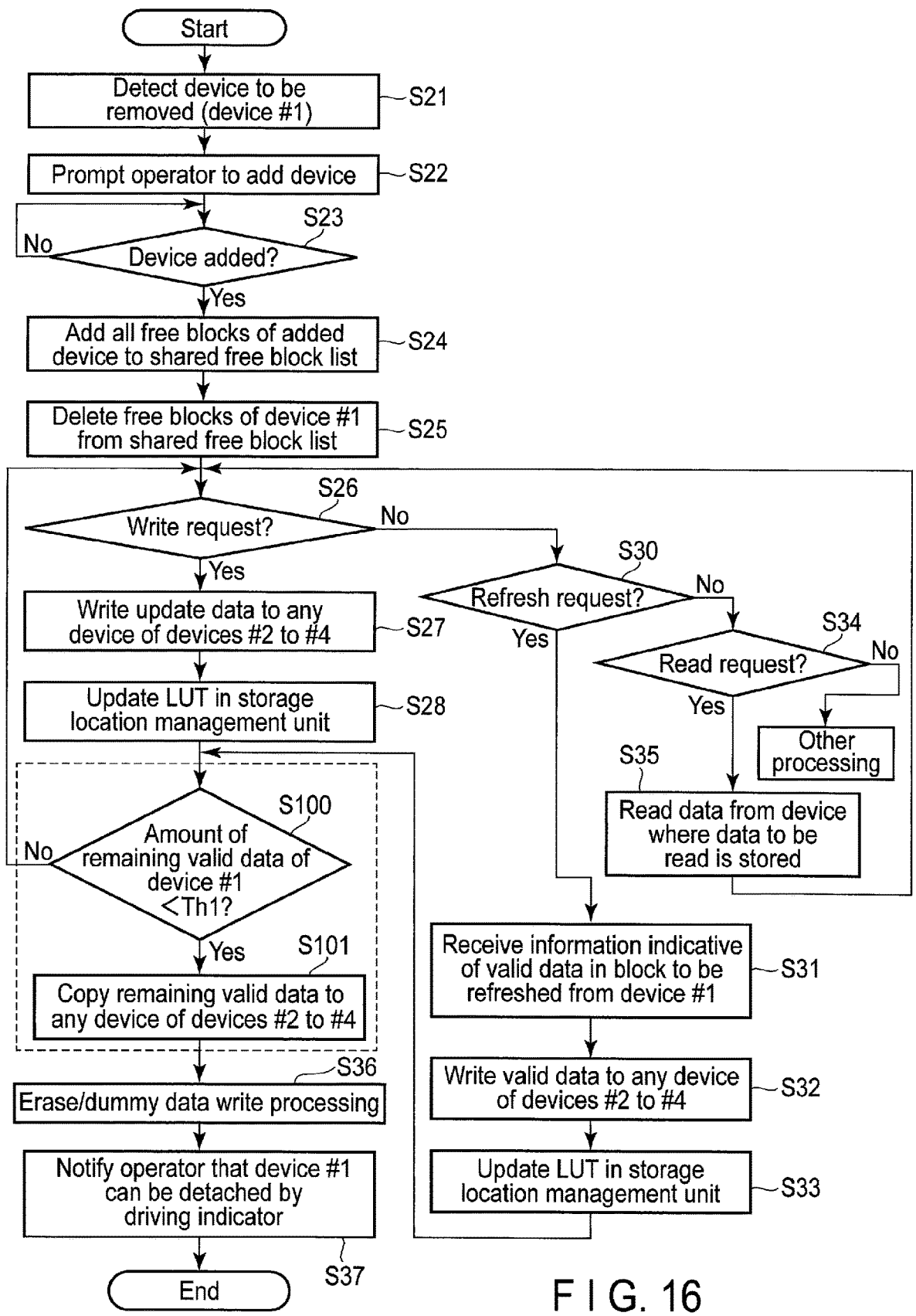
F I G. 16

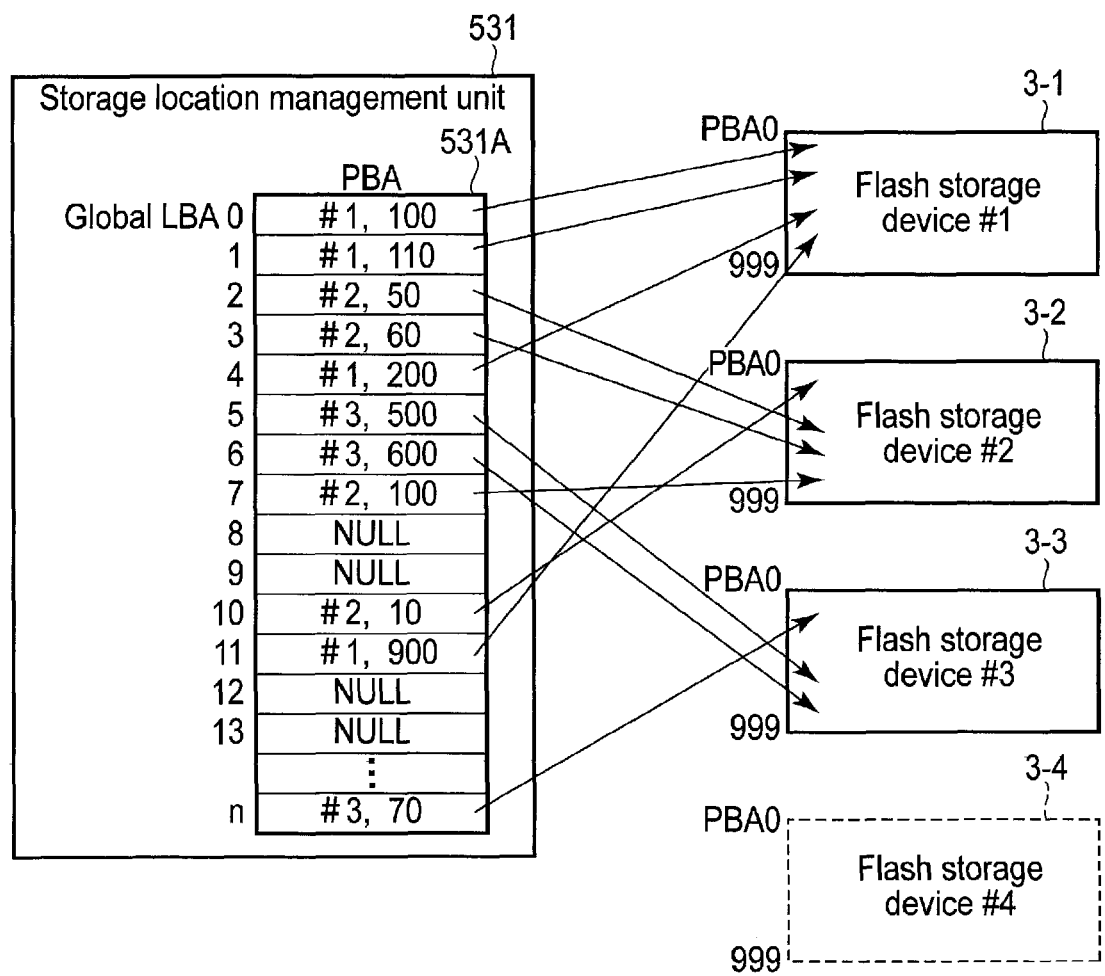
F I G. 18

INFORMATION PROCESSING SYSTEM FOR CONTROLLING STORAGE DEVICE

CROSS-REFERENCE TO RELATED APPLICATIONS

This application is based upon and claims the benefit of priority from Japanese Patent Application No. 2018-143750, filed Jul. 31, 2018, the entire contents of which are incorporated herein by reference.

FIELD

Embodiments described herein relate generally to a technology of controlling a storage device including a nonvolatile memory.

BACKGROUND

In recent years, storage devices including nonvolatile memories have been widely prevalent. As such a storage device, a solid state drive (SSD) based on a NAND flash technology is known.

The storage devices such as SSD are used as external storage devices for various information processing apparatuses such as computers.

In an information processing device, data copy processing for backing up data stored in a nonvolatile memory of a certain storage device to a nonvolatile memory of the other storage device may be executed.

However, a total amount of the data written to the storage system including the storage devices is increased while the data copy processing is executed between these storage devices. For this reason, a write performance seen from a host or a user may be degraded.

BRIEF DESCRIPTION OF THE DRAWINGS

FIG. 1 is a block diagram illustrating a configuration example of an information processing system according to an embodiment.

FIG. 2 is a block diagram illustrating a configuration example of a housing of a host device included in the information processing system of the embodiment.

FIG. 3 is a block diagram illustrating a configuration example of each storage device (flash storage device) included in the information processing system of the embodiment.

FIG. 4 is a diagram illustrating a configuration example of a lookup table managed by each flash storage device.

FIG. 5 is a diagram illustrating a configuration example of an LBA/global LBA management table managed by each flash storage device.

FIG. 9 is a block diagram illustrating processing of writing data portions corresponding to respective logical addresses (global LBA) belonging to a first logical address space to storage locations in plural storage devices (#1 to #3).

FIG. 10 is a block diagram illustrating a procedure of writing each of data portions corresponding to the respective logical addresses (global LBAs) to any storage location in any storage device selected from storage devices (#2 and #3) other than a storage device (#1) determined to be removed and an additional storage device (#4).

FIG. 16 is a flowchart illustrating another procedure of write/copy/read processing executed by the storage controller (host side storage controller) of the host device.

FIG. 18 is a block diagram illustrating processing of writing data portions corresponding to respective logical addresses (global LBAs) belonging to a first logical address space to storage locations (physical storage locations) in plural storage devices (#1 to #3).

DETAILED DESCRIPTION

Figure 6:
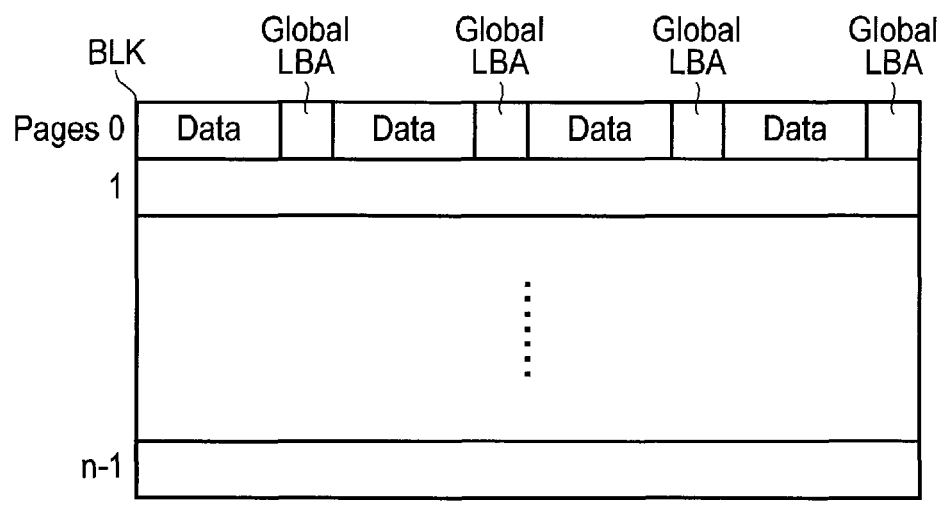
FIG. 6 is a diagram illustrating an operation of writing both data and global LBA to a block of the nonvolatile memory, which is executed each flash storage device.

Various embodiments will be described hereinafter with reference to the accompanying drawings.

In general, according to one embodiment, an information processing system comprises a plurality of storage devices each including a nonvolatile memory, and a storage controller. The storage controller writes each of data portions corresponding to logical addresses belonging to a first logical address space to any storage device selected from the plurality of storage devices, in accordance with write requests received from a host. The storage controller manages mapping between the logical addresses and addresses indicative of storage locations in the storage devices to which the data portions are written, by using an address translation table.

When it is determined that a first storage device of the plurality of storage devices is to be removed and an additional storage device including a nonvolatile memory is connected to the storage controller, the storage controller controls the first storage device in a first mode in which data write is inhibited and data read is permitted. The storage controller executes, in response to subsequent write requests received from the host, (i) first processing of writing update data portions corresponding to data portions already written to the first storage device, to any storage device selected from remaining one or more storage devices of the plurality of storage devices except for the first storage device and the additional storage device, and (ii) second processing of writing update data portions corresponding to data portions already written to the remaining one or more storage devices, to any storage device selected from the remaining one or more storage devices and the additional storage device.

First, a configuration of an information processing system 1 according to an embodiment will be described with reference to FIG. 1.

The information processing system 1 includes flash storage devices and a host (host device) 2. Each of the flash storage devices is a semiconductor storage device which include a nonvolatile memory and which is configured to write data to the nonvolatile memory and to read data from the nonvolatile memory. Three flash storage devices 3-1, 3-2, and 3-3 are connected to the host 2 to simplify the illustration, in FIG. 1, and the number of flash storage devices connected to the host 2 is not limited to three but may be, for example, five, ten or several tens.

Each of the flash storage devices 3-1, 3-2, and 3-3 may be implemented as a flash storage device based on the NAND flash technology.

The host 2 may be an information processing apparatus (computing device) which accesses the flash storage device 3. The host 2 may be a server computer or a personal computer. Each of the flash storage devices 3-1, 3-2, and 3-3 can be an external storage of the information processing apparatus which functions as the host 2. Each of the flash storage devices 3-1, 3-2, and 3-3 may be incorporated into the information processing apparatus or connected to the information processing apparatus via a cable or a network.

Each of the flash storage devices 3-1, 3-2, and 3-3 is connected to the host 2 via a connector 51 and a communication line 50. The connectors 51 may be implemented by, for example, a socket on a printed circuit board built in the information processing apparatus. Alternatively, the connectors 51 may be implemented as slots provided on a housing of the information processing apparatus.

The communication line 50 is used as an interface for interconnection between the host 2 and each of the flash storage devices 3-1, 3-2, and 3-3. As the interface standards, SCSI, Serial Attached SCSI (SAS), ATA, Serial ATA (SATA), PCI Express (PCIe) (registered trademark), Ethernet (registered trademark), Fibre Channel, NVM Express (NVMe) (registered trademark), and the like can be used.

Furthermore, the host 2 also comprises additional connector 51 (socket or slot) to connect additional flash storage device 3-4 to the host 2.

When a certain flash storage device reaches the lifetime, the flash storage device becomes unable to operate normally anymore.

For this reason, a system for backing up data stored in a certain flash storage device of flash storage devices 3-1, 3-2, and 3-3 before the certain flash storage device actually reaches lifetime is required. For example, the flash storage device 3-4 connected to the additional connector 51 is used to efficiently back up data stored in a specific flash storage device of large degree of wear before this flash storage device actually reaches lifetime.

The degree of wear of each of the flash storage devices 3-1, 3-2, and 3-3 may increase gradually in accordance with passage of time and the increase in number of programs/erase cycles of blocks in the nonvolatile memory. As the degree of wear of a certain flash storage device increases, the number of defective blocks which cannot be used normally increases gradually. When the number of defective blocks increases to a certain limit, the flash storage device reaches lifetime.

Thus, the degree of wear of the flash storage device can be estimated based on the number of defective blocks or the like. For this reason, the host 2 can determine the flash storage device having a high degree of wear as a flash storage device which should be removed (detached) and can execute processing for safely backing up the data stored in the determined flash storage device.

The host 2 comprises a processor 41, a memory 42, a host side storage controller 43, a network interface 44, and the like. The processor 41, the memory 42, the host side storage controller 43, and the network interface 44 may be interconnected via a bus 40.

The processor 41 is a CPU configured to control various components in the host 2. The processor 41 executes host software on the memory 42. The host software includes an application program layer 301, an operating system (OS) 302, a storage management program 303, and the like. The memory 42 is composed of a random access memory such as a DRAM.

As is generally known, the operating system (OS) 302 is software configured to manage the whole host 2, to control hardware in the host 2 and to execute control for enabling various applications running on an application program layer 301 to use the hardware and the flash storage devices 3-1 to 3-3 (or the flash storage devices 3-1 to 3-4) and the like.

The storage management program 303 is used to control the flash storage devices 3-1 to 3-3 (or the flash storage devices 3-1 to 3-4). The storage management program 303 executes processing of sending read/write requests to the host side storage controller 43 under the control of the operating system (OS) 302.

Furthermore, the storage management program 303 executes processing of specifying a flash storage device to be removed from the host 2, processing of prompting the operator to add the flash storage device to the host 2, and the like. The storage management program 303 monitors the degree of wear of each of the flash storage devices 3-1 to 3-3 and specifies the flash storage device having the degree of wear higher than a certain threshold degree as the flash storage device to be removed from the host 2. For example, the degree of wear of each of the flash storage devices may be determined based on the number of defective blocks included in each of the flash storage devices.

The host side storage controller 43 is a storage controller configured to control the flash storage devices 3-1 to 3-3 (or the flash storage devices 3-1 to 3-4). The host side storage controller 43 controls the flash storage devices 3-1 to 3-3 (or the flash storage devices 3-1 to 3-4) in accordance with the read/write requests from the host 2 (host software).

In addition, the host side storage controller 43 executes processing of notifying the operator of the flash storage device which can be removed from the host 2 by driving one of LEDs 52 corresponding to the respective flash storage devices 3-1 to 3-3. That is, each of the LEDs 52 functions as an indicator configured to indicate that the flash storage device corresponding to this LED can be removed. If a certain flash storage device becomes able to be removed, the host side storage controller 43 drives the LED 52 corresponding to the flash storage device and turns on the LED 52.

The host side storage controller 43 may be implemented as a RAID controller.

If the host 2 is implemented as an information processing apparatus comprising a software RAID function, the function of the host side storage controller 43 may be implemented by the processor 41.

Alternatively, the flash storage devices 3-1 to 3-3 (or the flash storage devices 3-1 to 3-4) may be provided in a storage array connected to the information processing apparatus which functions as the host 2 via a cable or a network. In this case, the host side storage controller 43 may be provided not in the information processing apparatus which functions as the host 2 but in the storage array.

Each of the flash storage devices 3-1 to 3-3 (or the flash storage devices 3-1 to 3-4) is connected to the host side storage controller 43 via the connector 51 and the connection line 50 in any one of the case where the host side storage controller 43 is provided in the host 2 and the case where the host side storage controller 43 is provided in the storage array.

In the case where the flash storage devices 3-1 to 3-3 (or the flash storage devices 3-1 to 3-4) are provided in the storage array, the connector 51 may be implemented by, for example, a socket on the printed circuit board built in the storage array. Alternatively, the connectors 51 may be implemented as slots provided on a housing of the storage array.

Implementing the host 2 by the information processing apparatus such as the server computer will be mainly described below.

In the general state where the flash storage devices 3-1 to 3-3 are connected to the host side storage controller 43 and where the flash storage device 3-4 is not connected to the host side storage controller 43, the host side storage controller 43 manages mapping between each of logical addresses belonging to a first logical address space to access the flash storage devices 3-1 to 3-3 and each of addresses indicative of storage locations in the flash storage devices 3-1 to 3-3 in which data portions corresponding to the respective logical addresses are written, by using an address translation table.

Each of the logical addresses belonging to the first logical address space is a logical address used by the host 2 (host software) to access the storage system comprising the flash storage devices 3-1 to 3-3 (or the flash storage devices 3-1 to 3-4). In other words, each of the logical addresses belonging to the first logical address space is a logical address designated by a read/write request sent from the host 2 (host software) to the host side storage controller 43. The host 2 (host software) requests the host side storage controller 43 to write data to a certain logical address belonging to the first logical address space or to read data from a certain logical address belonging to the first logical address space.

In general, a logical block address (LBA) is used as the logical address used by the host software. The logical address belonging to the first logical address space is also referred to as a global LBA.

The storage locations in the flash storage devices 3-1 to 3-3 to which the data portions corresponding to the respective logical addresses (global LBAs) belonging to the first logical address space are written may be logical storage locations in the flash storage devices or physical storage locations in the flash storage devices.

In the former case, the address translation table manages mapping between each of the logical addresses (global LBAs) belonging to the first logical address space and each of the local logical addresses (local LBAs) indicative of the logical storage locations in the flash storage devices 3-1 to 3-3 to which the data portions corresponding to the respective logical addresses (global LBAs) are written. A certain logical storage location in a certain flash storage device is represented by an identifier of the flash storage device and a logical address (LBA) in the logical address range (LBA range) for the flash storage device. Therefore, each of the local logical addresses (local LBAs) managed by the address translation table includes both the identifier of the flash storage device and a logical address (device LBA) in the logical address range (LBA range) for the flash storage device.

In the latter case, the address translation table manages mapping between each of the logical addresses (global LBAs) belonging to the first logical address space and each of the physical addresses indicative of the physical storage locations in the flash storage devices 3-1 to 3-3 to which the data portions corresponding to the respective logical addresses (global LBAs) are written. A certain physical storage location in a certain flash storage device is represented by an identifier of the flash storage device and a physical address indicative of a physical storage location of the nonvolatile memory in the flash storage device. Therefore, each of the physical addresses managed by the address translation table includes an identifier of the flash storage device and a physical address indicative of a physical storage location of the nonvolatile memory in the flash storage device.

The host side storage controller 43 writes each of the data portions corresponding to the respective logical addresses (global LBAs) belonging to the first logical address space to any flash storage device selected from the flash storage devices 3-1 to 3-3, in response to each of the write requests received from the host 2 (host software).

For example, when the host side storage controller 43 receives the write request to designate a specific global LBA from the host software, the host side storage controller 43 can select the flash storage device to which the data portion corresponding to the global LBA is to be written from the flash storage devices 3-1 to 3-3 and can further determine the logical storage location (or the physical storage location) in the selected flash storage device to which the data portion is to be written.

The host side storage controller 43 sends a write command designating the LBA indicative of the determined logical storage location (or the physical address indicative of the determined physical storage location) to the determined flash storage device. Then, the host side storage controller 43 updates the address translation table and maps the local LBA indicative of the logical storage location to which the data portion is written (or the physical address indicative of the physical storage location to which the data portion is written) to the above specific global LBA.

When it is determined that a specific flash storage device (for example, flash storage device 3-1) of the flash storage devices 3-1 to 3-3 is to be removed (exchanged) and the additional flash storage device 3-4 is connected to the host side storage controller 43 by being attached to a free slot 51, the host side storage controller 43 executes the following processing.

The host side storage controller 43 controls the flash storage device 3-1 in a first mode (write inhibit mode) in which data write is inhibited and data read is permitted.

In this case, the host side storage controller 43 does not select the flash storage device 3-1 as the flash storage device to which the data is to be written. Therefore, the host side storage controller 43 does not send the write command to the flash storage device 3-1. When the host side storage controller 43 receives a read request designating a specific global LBA from the host 2 (host software), the host side storage controller 43 acquires the local logical address (or physical address) associated with the specific global LBA from the address translation table by referring to the address translation table. If the acquired local logical address (or physical address) is indicative of the flash storage device 3-1, the host side storage controller 43 sends the read command designating the local logical address (or physical address) to the flash storage device 3-1.

Furthermore, to decrease the amount of valid data stored in the flash storage device (in this case, flash storage device 3-1) which is to be removed, the host side storage controller 43 executes first processing and second processing described below, in response to subsequent write requests received from the host 2 (host software).

(i) First processing: the host side storage controller 43 executes first processing of writing each of the update data portions corresponding to the respective data portions already written to the flash storage device to be removed (flash storage device 3-1), to any flash storage device selected from the remaining one or more flash storage devices (flash storage devices 3-2 and 3-3) of the plural flash storage devices (flash storage devices 3-1 to 3-3) except for the flash storage device to be removed and the additional flash storage device (flash storage device 3-4).

(ii) Second processing: the host side storage controller 43 executes second processing of writing each of the update data portions corresponding to the respective data portions already written to the remaining one or more flash storage devices (flash storage devices 3-2 and 3-3), to any flash storage device selected from the remaining one or more flash storage devices (flash storage devices 3-2 and 3-3) and the additional storage device (flash storage device 3-4).

The host side storage controller 43 can select any flash storage device from the flash storage devices 3-2, 3-3, and 3-4 and write each of the update data portions to the selected flash storage device.

For example, the host side storage controller 43 may select the flash storage device 3-4 in a certain period, select the flash storage device 3-3 in a subsequent period, select the flash storage device 3-2 in a further subsequent period, and select the flash storage device 3-4 again in a further subsequent period.

Therefore, in the first processing, each of the update data portions corresponding to the respective data portions already stored in the flash storage device 3-1 is written to, for example, the flash storage device 3-2, the flash storage device 3-3, or the flash storage device 3-4. The amount of the valid data stored in the flash storage device 3-1 is decreased by writing each of the update data portions corresponding to the respective data portions already stored in the flash storage device 3-1 to any flash storage device selected from the flash storage devices 3-2 to 3-4.

The valid data stored in the flash storage device 3-1 means the latest data associated with the global LBA.

In addition, in the second processing, each of the update data portions corresponding to the respective data portions already stored in the flash storage device 3-3 is written to, for example, the flash storage device 3-2 or the flash storage device 3-4. Thus, the update data portions can be written without executing garbage collection (GC) for securing a free region for writing each of the update data portions corresponding to the respective data portions already stored in the flash storage device 3-3, in the nonvolatile memory of the flash storage device 3-3. Therefore, the free region of the flash storage device 3-4 can be used as an over-provisioning region for the flash storage device 3-3. In other words, the free region of the flash storage device 3-4 can be used as the storage region for eliminating necessity of GC of the flash storage device 3-3.

Similarly, each of the update data portions corresponding to the respective data portions already stored in the flash storage device 3-2 is also written to, for example, the flash storage device 3-3 or the flash storage device 3-4. Thus, the update data portions can be written without executing garbage collection for securing a free region for writing each of the update data portions corresponding to the respective data portions already stored in the flash storage device 3-2, in the nonvolatile memory of the flash storage device 3-2. Therefore, the free region of the flash storage device 3-4 can be used as an over-provisioning region for the flash storage device 3-2. In other words, the free region of the flash storage device 3-4 can be used as the storage region for eliminating necessity of GC of the flash storage device 3-2.

The free space of the flash storage device 3-4 is remarkably larger than the free space of the flash storage device 3-1. Therefore, when the flash storage device 3-4 is added, the amount of the over-provisioning region of the storage system comprising the flash storage devices 3-1 to 3-4 is increased. Then, as each of the update data portions corresponding to the respective data portions already stored in the flash storage device 3-1 is written to any flash storage device selected from the flash storage devices 3-2 to 3-4, the amount of the over-provisioning region of the whole storage system is gradually decreased. When the amount of the valid data stored in the flash storage device 3-1 has become zero, the flash storage device 3-1 becomes able to be removed from the host 2. At this time, the amount of the over-provisioning region of the whole storage system becomes equal to the amount of the over-provisioning region of the whole storage system obtained immediately before addition of the flash storage device 3-4.

Thus, in the embodiments, a large-size free region of the flash storage device 3-4 can be used as the storage region for eliminating necessity of GC of the flash storage devices 3-2 and 3-3. Therefore, writing the data to the flash storage devices 3-2 to 3-4 can be executed in a state in which the amount of the over-provisioning region of the while storage system is increased. Therefore, the amount of the valid data stored in the flash storage device 3-1 can be decreased without causing reduction in the writing performance of the storage system seen from the host 2 and reduction in the writing performance of the storage system seen from the application/end user, and the backup operation of the valid data stored in the flash storage device 3-1 can be decreased.

If three global LBA ranges obtained by dividing the first logical address space are fixedly mapped to the respective flash storage devices 3-1, 3-2, and 3-3, respectively, for example, the update data portions corresponding to the respective data portions already stored in the flash storage device 3-3 need to be written to the flash storage device 3-3 at any time. Therefore, a large free region (i.e., a large number of free blocks) of the nonvolatile memory in the flash storage device 3-4 newly connected to the host 2 cannot be used as the over-provisioning region for the flash storage device 3-3. Similarly, each of the update data portions corresponding to the respective data portions already stored in the flash storage device 3-2 also needs to be written to the flash storage device 3-2 at any time. Therefore, a large free region (i.e., a large number of free blocks) in the nonvolatile memory in the flash storage device 3-4 newly connected to the host 2 cannot be used as the over-provisioning region for the flash storage device 3-2. In addition, the free region of the flash storage device 3-4 becomes a state of being reserved as a dedicated region for storing a duplicate of the data stored in the flash storage device 3-1. That is, since the free region of the flash storage device 3-4 is dedicated to copy the data of the flash storage device 3-1, the free region cannot be used as the storage region for eliminating the necessity of GC of the flash storage devices 3-2 and 3-3.

For this reason, when a method of fixedly mapping three global LBA ranges obtained by dividing the first logical address space to the respective flash storage devices 3-1, 3-2, and 3-3, respectively, is employed, an effect of increasing the amount of the over-provisioning region of the whole storage system cannot be obtained even if the flash storage device 3-4 is added.

FIG. 2 illustrates a configuration example of the host (information processing apparatus) 2.

The host 2 comprises a housing 201 shaped in a thin box which can be accommodated in a rack. For example, a plurality of slots that can accommodate a plurality of flash storage devices 3 are provided on a front surface 201A side of the housing 201.

One of the slots is used as a free slot to connect the additional flash storage device 3-4 to the host 2.

On the front surface 201A side, the above-described LEDs 52 may be disposed near the respective slots.

A system board (motherboard) 202 is disposed in the housing 201. On the system board (motherboard) 202, various electronic components including a processor 41, a memory 42, the host side storage controller 43 and the like are mounted.

The structure of the housing 201 illustrated in FIG. 2 can also be applied to the storage array comprising the flash storage devices 3-1, 3-2, and 3-3 (or the flash storage devices 3-1 to 3-4) and the host side storage controller 43.

FIG. 3 illustrates a configuration example of the flash storage device 3 used as any one of the flash storage devices 3-1 to 3-4.

The flash storage device 3 comprises a controller 4 and a nonvolatile memory (NAND flash memory) 5. The flash storage device 3 may also comprise a random access memory, for example, a DRAM 6.

The NAND flash memory 5 comprises a memory cell array comprising a plurality of memory cells arranged in a matrix. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKm−1. Each of blocks BLK0 to BLKm−1 is composed of a plurality of pages (pages P0 to Pn−1). Blocks BLK0 to BLKm−1 function as erase units. That is, each of the blocks BLK0 to BLKm−1 is a unit for erasing of data. The blocks may also be called erase blocks, physical blocks or physical erase blocks. Each of the pages P0 to Pn−1 comprises a plurality of memory cells connected to the same word line. Pages P0 to Pn−1 are units for a data write operation and a data read operation. That is, each of pages P0 to Pn−1 is a unit for reading and writing of data.

The controller 4 is electrically connected to the NAND flash memory 5 which is a nonvolatile memory via a NAND interface 13 such as Toggle NAND flash interface or Open NAND Flash Interface (ONFI). The controller 4 operates as a memory controller configured to control the NAND flash memory 5. The controller 4 may be implemented by a circuit such as a System-on-a-chip (SoC).

The controller 4 may function as a flash translation layer (FTL) configured to execute data management and block management of the NAND flash memory 5. The data management executed by the FTL includes (1) management of mapping information indicative of a correspondence between each of logical addresses within the logical address range for flash storage device and each of physical addresses in the NAND flash memory 5, (2) processing for concealing restrictions of the NAND flash memory 5 (for example, a read/write operation in page units and an erase operation in block units), and the like. Each of the logical addresses within the logical address range for the flash storage device 3 is an address used by the host 2 to designate an address of the location (logical storage location) within the logical address range of the flash storage device 3. As the logical address, logical block address (addressing) (LBA) can be used.

The management of mapping between each of the logical addresses within the logical address range for flash storage device and each of the physical addresses of the NAND flash memory 5 is executed by using a look-up table (LUT) 31 which functions as an address translation table (logical-to-physical address translation table). The logical address within the logical address range for flash storage device is indicative of the above device LBA. The controller 4 manages mapping between each of the logical addresses (device LBAs) and each of the physical addresses in units of predetermined management sizes, by using the LUT 31. The management size may be, for example, 4 Kbytes. A physical address corresponding to a certain logical address (device LBA) is indicative of the latest physical storage location in the NAND flash memory 5 to which the data corresponding to the logical address (device LBA) is written. LUT 31 may be loaded from the NAND flash memory 5 into the DRAM 6 when the power of the flash storage device 3 is turned on.

In the NAND flash memory 5, data can be written to a page only once per erase cycle. For this reason, the controller 4 writes update data corresponding to a certain logical address (device LBA) to not the physical storage location where previous data corresponding to the logical address (device LBA) is stored, but the other physical storage location. Then, the controller 4 updates LUT 31, associates a physical address of the other physical storage location with the logical address (device LBA), and invalidates the previous data.

The block management includes management of defective blocks (bad blocks), wear leveling, garbage collection (GC), refresh, and the like.

The defective block is indicative of a block where writing data to this block, reading data from this block, erase operation in this block, and the like cannot be executed normally.

The wear leveling is an operation of leveling the numbers of times of rewriting of blocks (i.e., numbers of program/erase cycles of blocks).

GC is an operation of increasing the number of free blocks. The free block is indicative of a block including no valid data. In GC, the controller 4 copies valid data in several blocks where the valid data and invalid data exist together to the other block (for example, a free block). In the flash storage device 3, the valid data is indicative of data associated with a certain logical address (device LBA). For example, data referred to by LUT 31 of the flash storage device 3 (i.e., data linked to the device LBA as the latest data) is valid data and may be read later by the host 2. The invalid data is indicative of data which is not associated with any device LBAs. The data which is not associated with any device LBAs is data which may not be read any more by the host 2. Then, the controller 4 updates LUT 31, and maps each of physical addresses of copy destinations to each of the device LBAs of the copied valid data. The block which includes only invalid data by copying the valid data to the other bloc is released as a free block. This block can be thereby reused after the erase operation for this block is executed.

Refresh is an operation of detecting each of blocks where data having an error bit count exceeding a threshold value is stored and rewriting the valid data in each of the detected blocks to the other block.

The controller 4 may comprise a host interface 11, a CPU 12, a NAND interface 13, a DRAM interface 14, an encoding/decoding circuit 15, and the like. The host interface 11, the CPU 12, the NAND interface 13, the DRAM interface 14, and the encoding/decoding circuit 15 may be interconnected via the bus 10.

The host interface 11 is a host interface circuit configured to execute communication with the host 2. The host interface 11 receives various commands from the host 2. The commands include various commands such as a write command, a read command and a trim command.

The CPU 12 is a processor configured to control the host interface 11, the NAND interface 13, the DRAM interface 14, and the encoding/decoding circuit 15. The CPU 12 loads a control program (firmware) from the NAND flash memory 5 or a ROM (not illustrated) to the DRAM 6 in response to power-on of the flash storage device 3 and executes various processing by executing the firmware. The firmware may be loaded into a SRAM in the controller 4, which is not illustrated in the drawings. The CPU 12 can execute command processing for processing various commands from the host 2, and the like. Operations of the CPU 12 are controlled by the above-described firmware executed by the CPU 12. Several or all parts of the command processing may be executed by dedicated hardware in the controller 4.

The CPU 12 can function as a write control unit 21, a read control unit 22, and a refresh control unit 23. Several or all parts of each of the write control unit 21, the read control unit 22, and the refresh control unit 23 may also be implemented by dedicated hardware in the controller 4.

The write control unit 21 executes a write operation of writing data (write data) associated with the write command to the write destination block in the NAND flash memory 5, in accordance with the write command received from the host 2. The write command may include a logical address (starting logical address) and a data length. The logical address (starting logical address) is an address indicative of the logical storage location (first logical storage location) to which the write data is to be written. A certain logical address (device LBA) within the logical address range for flash storage device is used as the logical address (starting logical address). The data length is indicative of the length of the data to be written. In the embodiments, the write command may further include a logical address (global LBA) in the first logical address space corresponding to the write data.

As regards the write command, a write command of a type directly designating the physical storage location to which the write data is to be written may be used. In this case, the write command includes the physical address indicative of the physical storage location to which the write data is to be written, and the data length. The write command may further include a logical address (global LBA) in the first logical address space corresponding to write data. The physical address included in the write command may include both of a block address indicative of the write destination block and a block offset indicative of the write destination location in the write destination block. This block offset may be represented by a page address and a page offset.

Alternatively, the physical address included in the write command may include the only block address indicative of the write destination block, and may not include the block offset. In this case, the write control unit 21 determines the write destination location in the write destination block, and writes the data portion associated with the write command to the determined write destination location in the write destination block. Then, the write control unit 21 notifies the host 2 of the physical address which includes both of the block address indicative of the write destination block and the block offset indicative of the determined write destination location. The host side storage controller 43 can thereby manage mapping between each of the global LBAs and each of the physical addresses (block addresses and block offsets) and can efficiently manage the data placement in the flash storage devices 3-1 to 3-4. That is, the host side storage controller 43 can write the data portion which is to be written to a certain global LBA to any free region (any free block) in any flash storage device selected from the flash storage devices 3-1 to 3-4.

The read control unit 22 reads the data designated by the read command from the NAND flash memory 5 in accordance with the read command received from the host 2. The read command may include a logical address (starting logical address) and a data length. The logical address (starting logical address) is an address indicative of the logical storage location where the data to be read is stored. A certain logical address (device LBA) within the logical address range for flash storage device is used as this logical address (starting logical address). The data length is indicative of the length of the data to be read. Alternatively, the read command may include the logical address (starting logical address), the physical address (block address and block offset), and the data length. In this case, the read operation control unit 22 reads the data from the NAND flash memory 5, based on the physical address (block address and block offset).

The refresh control unit 23 executes the refresh operation of rewriting the valid data in each of the blocks where the data having an error bits count exceeding a threshold value is stored to the other block. More specifically, the refresh control unit 23 executes patrol read of detecting each of the blocks where the data having an error bit count exceeding a threshold value is stored, of plural blocks included in the NAND flash memory 5. The error bit count indicates the number of error bits. In the patrol read, the valid data is read from each of blocks in predetermined data length units, and the error bit count (number of ECC error bits) of the read data is checked by an ECC decoder incorporated in the encoding/decoding circuit 15. For example, if the error bit count of the read data exceeds a predetermined number of bits and the error bit count is equal to or smaller than the number of bits which can be corrected by the ECC decoder, the block where the read data is stored is determined as a block subjected to refresh. The patrol read for all of the blocks containing the valid data is executed during a predetermined refresh period. In a case where the flash storage device 3 is in the general operation mode in which both the data write and the data read are permitted, the refresh control unit 23 executes the refresh operation including both the operation (patrol read) of detecting each of the blocks where the data having the error bits count exceeding a threshold value is stored and the operation of rewriting the valid data in each of the detected blocks to the other block.

In contrast, in a case where the flash storage device 3 is in the write inhibit mode in which the data write is inhibited and the data read is allowed, the refresh control unit 23 executes the refresh operation including both the operation (patrol read) of detecting each of the blocks where the data having the error bit count exceeding a threshold value is stored and the operation of requesting (refresh request) the host 2 to copy the valid data in each of the detected blocks to the other flash storage device. The refresh request is a copy request for refresh. The refresh request may include information indicative of the global LBA corresponding to the valid data in each of the blocks where the data having the error bit count exceeding a threshold value is stored. The flash storage device 3 can thereby notify the host 2 of the global LBA of the valid data which is required to be copied (rewritten) from the flash storage device 3 to the other flash storage device.

The NAND interface 13 is a memory control circuit configured to control the NAND flash memory 5 under the control of the CPU 12. The DRAM interface 14 is a DRAM control circuit configured to control the DRAM 6 under the control of the CPU 12. A part of a storage region of the DRAM 6 is used to store the LUT 31. In addition, the other parts of the storage region in the DRAM 6 are used to store a block management table 32 and an LBA/global LBA management table 33.

The block management table 32 is used to manage the valid data/invalid data. The block management table 32 may be provided in, for example, each of blocks in the NAND flash memory 5. In the block management table 32 corresponding to a certain block, a bit map flag indicative of validity/invalidity of each of the data portion in this block is stored.

The LEA/global LBA management table 33 is a management table for managing correspondence between each of LBAs for the flash storage device 3 and each of the global LBAs.

The encoding/decoding circuit 15 may function as, for example, an error correcting code (ECC) encoder and an ECC decoder. When the data is to be written to the NAND flash memory 5, the encoding/decoding circuit 15 encodes (ECC-encodes) the data (i.e., data to be written) and thereby adds an error-correcting code (ECC) to the data as a redundant code. When the data is read from the NAND flash memory 5, the encoding/decoding circuit 15 executes error correction (ECC decoding) of the data by using the ECC added to the read data.

FIG. 4 illustrates a configuration example of the LUT 31 managed by the flash storage device 3.

The LUT 31 includes entries corresponding to respective LBAs (LBA0 to LBAx) for the flash storage device 3. Each of the entries is used to store the physical address (PBA) indicative of the physical storage location in the NAND flash memory 5 where data of LBA corresponding to the entry is stored.

FIG. 5 illustrates a configuration example of the LBA/global LBA management table 33 managed by the flash storage device 3.

The LBA/global LBA management table 33 may include entries corresponding to the respective LBAs (LBA0 to LBAx) for the flash storage device 3. In this case, each of the entries is used to store the global LBA corresponding to the LBA corresponding to this entry.

FIG. 6 illustrates an operation of writing both of the data and the global LBA to a write destination block BLK of the NAND flash memory 5, which is executed by the flash storage device 3.

As described above, each of the write commands sent from the host 2 to the flash storage device 3 includes both the LBA indicative of the logical storage location in the flash storage device 3 to which a write data portion is to be written (or, the physical address indicative of the physical storage location in the NAND flash memory 5 of the flash storage device 3 to which the write data portion is to be written), and the global LBA corresponding to this write data portion. The controller 4 (write control unit 21) of the flash storage device 3 may write a pair of the write data portion and the global LBA corresponding to this write data portion to the write destination block BLK as illustrated in FIG. 6. For example, in each of the blocks, each page may include both of a user data region (16 KB) for storing the user data and a redundant region for storing the management data. The page size is over 16 KB. The controller 4 may write both of the write data portion having the same size as the above-described management size (for example, 4 KB) of the LUT 31 and the global LBA corresponding to this write data portion to the page in the write destination block ELK.

Alternatively, the controller 4 may write the write data portion having the same size as the above-described management size (for example, 4 KB), the global LBA corresponding to this write data portion, and the LBA (device LBA) corresponding to this write data portion to the page in the write destination block BLK.

Figure 7:
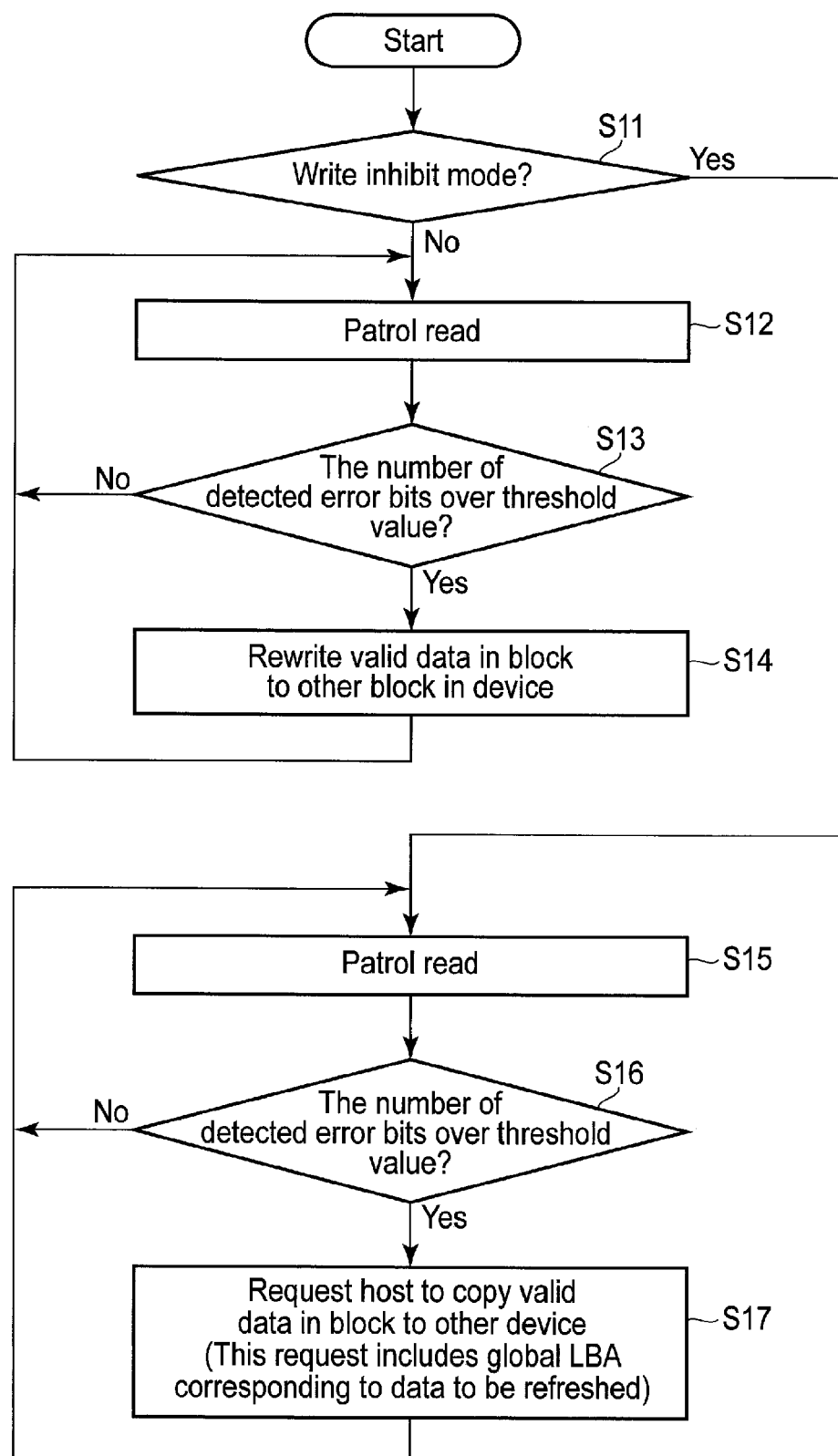
FIG. 7 is a flowchart illustrating both of a procedure of a refresh operation executed by each flash storage device in a general operation mode and a procedure of a refresh operation executed by each flash storage device in a write inhibit mode.

A flowchart of FIG. 7 illustrates both of a procedure of the refresh operation executed by each of the flash storage devices in the general operation mode, and a procedure of the refresh operation executed by each of the flash storage devices in the write inhibit mode.

The controller 4 (refresh control unit 23) of each flash storage device connected to the host 2 determines in which mode of the general operation mode and the write inhibit mode the flash storage device is set (step S11).

If the flash storage device is set in the general operation mode (NO in step S11), the controller 4 executes the patrol read for all of the blocks containing the valid data (step S12). The patrol read is executed on a schedule on which the patrol read for all of the blocks containing the valid data is executed during the refresh period. Then, the controller 4 detects the number of error bits of the valid data read by the patrol read and determines whether or not the detected number of error bits is over a predetermined threshold value (step S13). If the detected number of error bits is over the predetermined threshold value (YES in step S13), the controller 4 detects the block where the valid data having the detected number of error bits is stored as the block subjected to refresh (i.e., the block where the data having the error bit count over the threshold value is stored). Then, the controller 4 rewrites the valid data in the detected block subjected to refresh to the other block (free block) (step S14). In step S14, the valid data error-corrected by the encoding/decoding circuit 15 is rewritten to the other block.

If the flash storage device is set in the write inhibit mode (YES in step S11), the controller 4 executes the patrol read for all of the blocks containing the valid data (step S15). The patrol read is executed on a schedule on which the patrol read for all of the blocks containing the valid data is executed during the refresh period. Then, the controller 4 detects the number of error bits of the valid data read by the patrol read and determines whether or not the detected number of error bits is over the above predetermined threshold value (step S16). If the detected number of error bits is over the predetermined threshold value (YES in step S16), the controller 4 detects the block where the valid data having the detected number of error bits is stored as the block subjected to refresh (i.e., the block where the data having the error bit count over the threshold value is stored). Then, the controller 4 executes the refresh operation of requesting the host 2 (host side storage controller 43) to copy the valid data in the detected block subjected to refresh to the other flash storage device (step S17). In step S17, the controller 4 may voluntarily send the refresh request including the information indicative of the global LBA corresponding to the valid data in the detected block subjected to refresh to the host 2 (host side storage controller 43). Alternatively, in step S17, the controller 4 may send an interrupt signal indicative of presence of the block subjected to refresh to the host 2 (host side storage controller 43). If the host side storage controller 43 receives the interrupt signal, the host side storage controller 43 may acquire the information indicative of the global LBA corresponding to the valid data in the detected block subjected to refresh from the controller 4.

Figure 8:
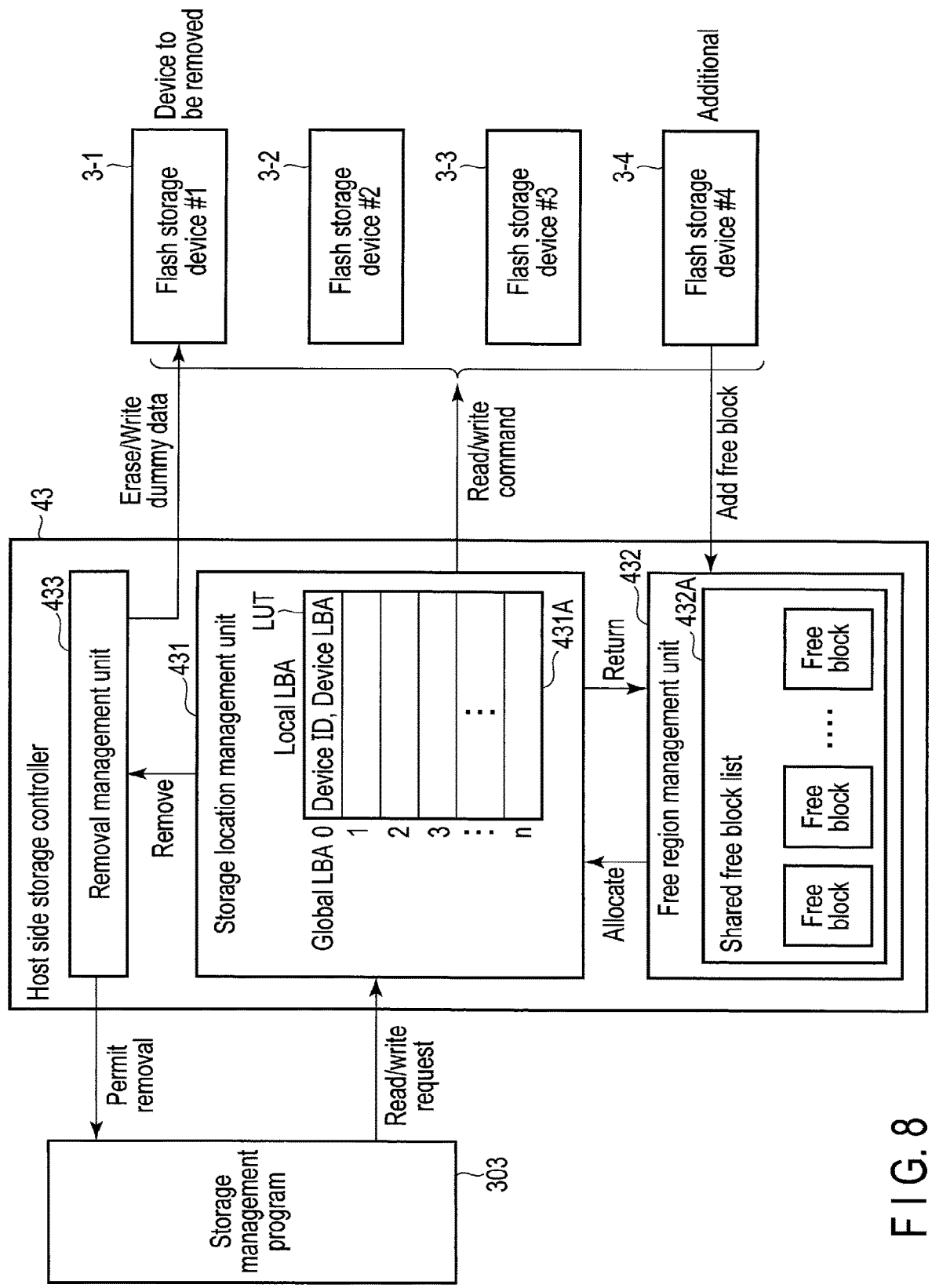
FIG. 8 is a block diagram illustrating a configuration example of a storage controller (host side storage controller) of the host device included in the information processing system of the embodiment.

FIG. 8 illustrates a configuration example of the host side storage controller 43.

The host side storage controller 43 comprises a storage location management unit 431, a free region management unit 432, and a remove management unit 433. The storage location management unit 431 manages a lookup table (LUT) 431A which functions as a host side address translation table. The host side storage controller 43 uses LUT 431A to manage mapping between each of the logical addresses (global LBAs) belonging to the first logical address space and each of the storage locations in the flash storage devices 3-1 to 3-3 (or flash storage devices 3-1 to 3-4) to which the data portions corresponding to the respective global LBAs are written.

In this case, the storage location management unit 431 may manage mapping between each of the logical addresses (global LBAs) belonging to the first logical address space and each of the local logical addresses (local LBAs) indicative of the logical storage locations in the flash storage devices 3-1 to 3-3 (or flash storage devices 3-1 to 3-4) to which the data portions corresponding to the respective global LBAs are written, using LUT 431A. Alternatively, the storage location management unit 431 may manage mapping between each of the logical addresses (global LBAs) belonging to the first logical address space and each of the physical addresses indicative of the physical storage locations in the flash storage devices 3-1 to 3-3 (or flash storage devices 3-1 to 3-4) to which the data portions corresponding to the respective global LBAs are written, using LUT 431A.

In FIG. 8, it is assumed that mapping between each of the global LBAs and each of the local LBAs is managed by LUT 431A.

That is, LUT 431A includes entries corresponding to the respective global LBAs (global LBA0 to global LBAn). An entry corresponding to a certain global LBA stores a local LBA indicative of a specific logical storage location in the flash storage devices 3-1 to 3-3 (or the flash storage devices 3-1 to 3-4) where the data portion corresponding to this global LBA is stored. Each local LBA includes a device ID and a device LBA. The device ID is an identifier of a certain flash storage device. The device LBA is indicative of one of LBAs within the LBA range for this storage device.

In a state in which the flash storage devices 3-1 to 3-3 are connected to the host side storage controller 43, the storage location management unit 431 can write each of the data portions corresponding to the respective LBAs to an any logical storage location (device LBA) in an any storage device selected from the flash storage devices 3-1 to 3-3. More specifically, when the storage location management unit 431 receives a write request including both of a specific global LBA and a specific data length from the host software (for example, the storage management program 303), the storage location management unit 431 can select the flash storage device to which the write data portion corresponding to the specific global LBA is to be written from the flash storage devices 3-1 to 3-3 and can select a LBA (device LBA) to which the write data portion corresponding to the specific global LBA is to be written from within the LBA range for the selected flash storage device. The storage location management unit 431 sends to the selected flash storage device a write command to write the data portion. This write command may include the selected device LBA and the specific data length. Furthermore, this write command may include the specific global LBA. Then, the storage location management unit 431 updates LUT 431A, and associates the local LBA indicative of the logical storage location to which the data portion is written (i.e., the device ID of the flash storage device to which this data portion is written and the device LBA indicative of the logical storage location to which this data portion is written) with the specific global LBA.

In a state in which the flash storage devices 3-1 to 3-3 are connected to the host side storage controller 43, the free region management unit 432 manages the free regions of the respective flash storage devices 3-1 to 3-3 (i.e., all of the free blocks included in the NAND flash memory of each of the flash storage devices 3-1 to 3-3) as a set of the free regions (free blocks) shared by the flash storage devices 3-1 to 3-3, by using a shared free block list 432A. As a policy of selecting the flash storage device to which the data portions is to be written, a policy of selecting the flash storage device having a free region of the largest size of the flash storage devices 3-1 to 3-3 with priority as the flash storage device to which the data portion is to be written may be employed. Alternatively, a policy of selecting the flash storage devices 3-1 to 3-3 at the same rate as the flash storage devices to which the data portions are to be written such that the free regions of the respective flash storage devices 3-1 to 3-3 are consumed equally may be employed.

The storage location management unit 431 may write each of the data portions corresponding to the respective global LBAs to any storage device selected from the flash storage devices 3-1 to 3-3 by selecting a write destination block to which the data portions are to be written from a set of the shared free blocks managed by the shared free block list 432A. The free block selected from the set of the shared free blocks is allocated as the write destination block. The flash storage device including the write destination block may be selected as the flash storage device to which the data portions are to be written. In each of the flash storage devices, if all of the data in a certain block are invalidated by overwrite/unmapping, GC, and the like, this block is returned to the shared free block list 432A. The returned block is reused as the shared free block.

Next, it is assumed that it is determined that the flash storage device 3-1 should be removed from the host side storage controller 43 due to the increase in number of the defective blocks of the flash storage device 3-1, and that the flash storage device 3-4 is connected to the host side storage controller 43.

The storage location management unit 431 controls the flash storage device 3-1 in the above-described write inhibit mode in which data write is inhibited and data read is permitted. Furthermore, the storage location management unit 431 executes write processing of decreasing the amount of the valid data stored in the flash storage device 3-1 to be removed, by writing each of the data portions corresponding to the respective global LBAs to any logical storage location in any flash storage device selected from the flash storage devices 3-2 to 3-4. In this case, each of the update data portions corresponding to the respective data portions already stored in the flash storage device 3-1 is written to any flash storage device selected from the flash storage devices 3-2, 3-3, and 3-4. Similarly, each of the update data portions corresponding to the respective data portions already stored in the flash storage device 3-2 is also written to any flash storage device selected from the flash storage devices 3-2, 3-3, and 3-4. Similarly, each of the update data portions corresponding to the respective data portions already stored in the flash storage device 3-3 is also written to any flash storage device selected from the flash storage devices 3-2, 3-3, and 3-4.

When the flash storage device 3-4 is connected to the host 2, the free region management unit 432 adds all of the free blocks included in the NAND flash memory of the flash storage device 3-4 to the shared free block list 432A and further deletes each of the free blocks included in the flash storage device 3-1 from the shared free block list 432A. Thus, when the flash storage device 3-4 is connected to the host 2, the free region management unit 432 can manage each of the free blocks included in the NAND flash memory of the flash storage device 3-2, each of the free blocks included in the NAND flash memory of the flash storage device 3-3, and each of the free blocks included in the NAND flash memory of the flash storage device 3-4, as a set of the shared free blocks shared by the flash storage devices 3-1 to 3-4, by using the shared free block list 432A.

The storage location management unit 431 may employ the policy of selecting the flash storage device having the free region of the largest size (i.e., a largest number of free blocks) with priority, as the flash storage device to which the data portions are to be written.

In this case, the storage location management unit 431 executes first write processing of writing (i) each of the update data portions corresponding to the respective data portions already written to the flash storage device 3-1, (ii) each of the update data portions corresponding to the respective data portions already written to the flash storage device 3-2, and (iii) each of the update data portions corresponding to the respective data portions already written to the flash storage device 3-3, to the flash storage device 3-4, in response to the write requests received from the host 2 (host software).

Furthermore, after the free region is secured in the flash storage device 3-2 or 3-3 by the first write processing, the storage location management unit 431 executes second write processing of writing (i) each of the update data portions corresponding to the respective data portions already written to the flash storage device 3-1, (ii) each of the update data portions corresponding to the respective data portions already written to the flash storage device 3-2, and (iii) each of the update data portions corresponding to the respective data portions already written to the flash storage device 3-3, to the flash storage device 3-2 or 3-3, in response to the write requests received from the host 2 (host software).

In the first write processing, not only each of the update data portions corresponding to the respective data portions already stored in the flash storage device 3-1, but also each of the update data portions corresponding to the respective data portions already stored in the flash storage device 3-2 or 3-3 are written to the free region of the flash storage device 3-4. Therefore, each of the update data portions corresponding to the respective data portions already stored in the flash storage device 3-2 or 3-3 can be written to the free region of the large size in the flash storage device 3-4 without executing GC for securing the free region (free block) in the flash storage device 3-2 or 3-3. Therefore, the capacity corresponding to a large number of free blocks included in the NAND flash memory of the flash storage device 3-4 can be used efficiently as the over-provisioning region of the whole storage system comprising the flash storage devices 3-1 to 3-4. In addition, the amount of the free region (number of free blocks) in the flash storage device 3-2 or 3-3 can be increased by the first write processing. Therefore, in the second write processing, the free region secured by the first write processing can be used efficiently.

Furthermore, when the amount of the valid data being stored in the flash storage device 3-1 to be removed from the host 2 is decreased to a permissible amount, the storage location management unit 431 may copy the valid data in the flash storage device 3-1 to any one of the flash storage devices 3-2 to 3-4.

If the processing of copying the valid data in the flash storage device 3-1 to any one of the flash storage devices 3-2 to 3-4 is started unconditionally, a large amount of valid data stored in the flash storage device 3-1 needs to be copied and the amount of data written to the whole storage system is thereby increased. As a result, the performance of the storage system seen from the host software may be degraded.

In the embodiments, the processing of copying the valid data in the flash storage device 3-1 to any one of the flash storage devices 3-2 to 3-4 is executed when the amount of the valid data in the flash storage device 3-1 is decreased to be below a threshold value (the permissible amount). The degradation in performance of the storage system seen from the host software can be thereby suppressed efficiently.

In addition, when the storage location management unit 431 receives the refresh request from the flash storage device 3-1, the storage location management unit 431 may execute an operation of copying the valid data in each of the blocks (i.e., the blocks where the data having the error bit count over a threshold value is stored) detected by the refresh operation executed by the flash storage device 3-1 to any flash storage device selected from the flash storage devices 3-2 to 3-4. The data copy operation for refresh is a data write operation to be executed irrespective of whether the flash storage device 3-1 is removed or not. Therefore, the operation of copying the valid data in each of blocks detected by the refresh operation executed by the flash storage device 3-1 to any one of the flash storage devices 3-2 to 3-4 does not increase the amount of the data written to the whole flash storage system.

In addition, the storage location management unit 431 determines whether or not the valid data stored in the flash storage device 3-1 is absent. Mapping between each of the global LBAs and each of the local LBAs indicative of the latest logical storage locations where the data portions corresponding to the global LBAs are stored is managed by LUT 431A. Therefore, the storage location management unit 431 can determine whether the valid data stored in the flash storage device 3-1 is absent or not by referring to LUT 431A. In this case, if the entry pointing to the flash storage device 3-1 is not present in LUT 431A, the storage location management unit 431 can determine that the valid data is not present in the flash storage device 3-1.

When the valid data is not present in the flash storage device 3-1, the storage location management unit 431 may notify the removal management unit 433 that the flash storage device 3-1 can be removed from the host 2.

When the valid data is not present in the flash storage device 3-1, the removal management unit 433 may send an erase command for instructing to perform an erase operation on each of the blocks in the NAND flash memory of the flash storage device 3-1, to the flash storage device 3-1. Furthermore, the removal management unit 433 may write predetermined data (dummy data) to each of the blocks where the erase operation is executed, in the flash storage device 3-1.

Alternatively, in a case where the storage location management unit 431 is configure to manage mapping each of the global LEAs and each of the physical addresses by using LUT 431A, the storage location management unit 431 can easily determine whether each of the blocks in the flash storage device 3-1 becomes a free block which does not include the valid data or not. Therefore, in this case, every time one of the blocks of the NAND flash memory in the flash storage device 3-1 becomes a block which does not include the valid data by the above write processing of the update data, or copy processing or the like, the removal management unit 433 may send the erase command for instructing to perform an erase operation on the block which does not include the valid data, to the flash storage device 3-1. The erase operation of erasing each of the blocks which do not include the valid data can be executed simultaneously with the processing of decreasing the amount of the valid data of the flash storage device 3-1 by the above write processing, copy processing or the like. As a result, a period from the time when the valid data stored in the flash storage device 3-1 becomes absent to the time when the erase operations on all of the blocks in the flash storage device 3-1 are completed can be minimized.

Every time the erase operation is executed on one block in the flash storage device 3-1, the removal management unit 433 may write predetermined data (dummy data) to the block where the erase operation is executed.

If no valid data is stored in the flash storage device 3-1, if the erase operation for all of the blocks of the flash storage device 3-1 is completed or if both of the erase operation for all of the blocks and the dummy data writing operation are completed, the removal management unit 433 may notify the storage management program 303 that the flash storage device 3-1 can be removed.

Then, for example, the removal management unit 433 may drive LED 52 corresponding to the flash storage device 3-1 under control of the storage management program 303.

FIG. 9 illustrates processing of writing the data portions corresponding to the respective global LBAs to the storage locations in the flash storage devices 3-1 to 3-3.

In FIG. 9, the flash storage devices 3-1 to 3-3 have the same capacity and the device LBA range (LBA0 to LBA999) is allocated to each of the flash storage devices 3-1 to 3-3, to simplify the illustration.

As described above, the data portion associated with each of the write requests sent from the host software to the host side storage controller 43 (i.e., the data portion corresponding to each global LBA) can be written to any logical storage location in the storage system comprising the flash storage devices 3-1 to 3-3. In FIG. 9, it is assumed that the data portion corresponding to global LBA0 is written to LBA100 in the flash storage device 3-1, that the data portion corresponding to global LBA1 is written to LBA110 in the flash storage device 3-1, that the data portion corresponding to global LBA2 is written to LBA50 in the flash storage device 3-2, that the data portion corresponding to global LBA3 is written to LBA60 in the flash storage device 3-2, that the data portion corresponding to global LBA4 is written to LBA200 in the flash storage device 3-1, that the data portion corresponding to global LBA5 is written to LBA500 in the flash storage device 3-3, that the data portion corresponding to global LBA6 is written to LBA600 in the flash storage device 3-3, that the data portion corresponding to global LBA7 is written to LBA100 in the flash storage device 3-2, that the data portion corresponding to global LBA10 is written to LBA10 in the flash storage device 3-2, that the data portion corresponding to global LBA11 is written to LBA900 in the flash storage device 3-1, and that the data portion corresponding to global LBAn is written to LBA70 in the flash storage device 3-3.

In LUT entry corresponding to global LBA0, device ID=#1 and device LBA=100 are stored. In LUT entry corresponding to global LBA1, device ID=#1 and device LBA=110 are stored. In LUT entry corresponding to global LBA2, device ID=#2 and device LBA=50 are stored. In LUT entry corresponding to global LBA3, device ID=#2 and device LBA=60 are stored. In LUT entry corresponding to global LBA4, device ID=#1 and device LBA=200 are stored. In LUT entry corresponding to global LBA5, device ID=#3 and device LBA=500 are stored. In LUT entry corresponding to global LBA6, device ID=#3 and device LBA=600 are stored. In LUT entry corresponding to global LBA7, device ID=#2 and device LBA=100 are stored. In LUT entry corresponding to global LBA10, device ID=#2 and device LBA=10 are stored. In LUT entry corresponding to global LBA11, device ID=#1 and device LBA=900 are stored. In LUT entry corresponding to global LBAn, device ID=#3 and device LBA=70 are stored.

In LUT entry corresponding to the global LBA to which the data portion is not written, a predetermined constant (NULL) may be stored.

FIG. 10 illustrates a procedure of writing each of the data portions corresponding to the respective global LBAs to any storage location (logical storage location) in any flash storage device selected from the flash storage devices 3-2 and 3-3 other than the flash storage device 3-1, and the additional flash storage device 3-4.

The capacity of the additional flash storage device 3-4 may be below the capacity of the flash storage device 3-1 determined to be removed, may be the same as the capacity of the flash storage device 3-1, or may be larger than the capacity of the flash storage device 3-1. In FIG. 10, the flash storage device 3-3 has the same capacity as the flash storage device 3-1 and the device LBA range (LBA0 to LBA999) is allocated to each of the flash storage devices 3-1 to 3-4, to simplify the illustration.

When the additional flash storage device 3-4 is connected to the host 2 (host side storage controller 43), the entry corresponding to the flash storage device 3-4 is added to the shared free block list 432A. Then, a list of all of the free blocks in the NAND flash memory of the flash storage device 3-4 is added to the entry corresponding to the flash storage device 3-4. The shared free block list 432A may manage the only number of free blocks included in each flash storage device or may manage block addresses identifying the respective free blocks included in each of the flash storage devices.

As described above, the data portion corresponding to each of the global LBAs can be written to any logical storage location in the storage system comprising the flash storage devices 3-2 to 3-4. In FIG. 10, after the additional flash storage device 3-4 is connected to the host 2, each of the data portions associated with several write requests sent from the host software to the host side storage controller 43 is written to the flash storage device 3-4. These write requests may include a write request to request writing (overwriting) the update data portion to the global LBA where the data portion is already written, and a write request to request writing a new data portion to the global LBA where the data portion is not written.

In FIG. 10, each of the write requests to request writing (overwriting) the update data portions to the respective global LBA0 to global LBA5 where the data portions are already written is sent from the host software to the host side storage controller 43.

When the storage location management unit 431 receives the write request to request writing the data portion to the global LBA0 from the host software, the storage location management unit 431 writes the data portion associated with the received write request to, for example, LBA0 of the flash storage device 3-4. This data portion is an update data portion to be written to the global LBA0. Since the local LBA corresponding to the global LBA0 is indicative of the flash storage device 3-1, this data portion is an update data portion corresponding to the data portion already written to the flash storage device 3-1. Therefore, the update data portion corresponding to the data portion already stored in the flash storage device 3-1 is written to a logical storage location (LBA0) of the flash storage device 3-4. Then, the storage location management unit 431 associates the address (local LBA) indicative of the storage location (logical storage location) where this update data portion is written with the global logical address (global LBA0) corresponding to this update data portion. In other words, the storage location management unit 431 updates the LUT entry corresponding to the global LBA0 and changes the local LBA mapped to the global LBA0 from (device ID=#1, device LBA=100) to (device ID=#4, device LBA=0). Furthermore, the storage location management unit 431 may send a command (trim command) to invalidate the data portion of the device LBA=100 to the flash storage device 3-1.

Since the flash storage device 3-1 is in the write inhibit mode, the free region of the flash storage device 3-1 does not need to be increased and, therefore, the trim command may be sent or may not be sent to the flash storage device 3-1.

When the storage location management unit 431 receives the write request to request writing the data portion to the global LBA1 from the host software, the storage location management unit 431 writes the data portion associated with the received write request to, for example, LBA5 of the flash storage device 3-4. This data portion is an update data portion to be written to the global LBA1. Since the local LBA corresponding to the global LBA1 is indicative of the flash storage device 3-1, this data portion is an update data portion corresponding to the data portion already written to the flash storage device 3-1. Therefore, the update data portion corresponding to the data portion already stored in the flash storage device 3-1 is written to LBA5 of the flash storage device 3-4. Then, the storage location management unit 431 updates the LUT entry corresponding to the global LBA1 and changes the local LBA mapped to the global LBA1 from (device ID=#1, device LBA=110) to (device ID=#4, device LBA=5). Furthermore, the storage location management unit 431 may send a trim command to invalidate the data portion of the device LBA=110 to the flash storage device 3-1.

When the storage location management unit 431 receives the write request to request writing the data portion to the global LBA2 from the host software, the storage location management unit 431 writes the data portion associated with the received write request to, for example, LBA10 of the flash storage device 3-4. This data portion is an update data portion to be written to the global LBA2. Since the local LBA corresponding to the global LBA2 is indicative of the flash storage device 3-2, this data portion is an update data portion corresponding to the data portion already written to the flash storage device 3-2. Therefore, the update data portion corresponding to the data portion already stored in the flash storage device 3-2 is written to LBA10 of the flash storage device 3-4. Then, the storage location management unit 431 updates the LUT entry corresponding to the global LBA2 and changes the local LEA mapped to the global LBA2 from (device ID=#2, device LBA=50) to (device ID=#4, device LBA=10). Furthermore, the storage location management unit 431 sends a trim command to invalidate the data portion of the device LBA=50 to the flash storage device 3-2. The free region of the flash storage device 3-2 can be thereby increased easily.

When the storage location management unit 431 receives the write request to request writing the data portion to the global LBA3 from the host software, the storage location management unit 431 writes the data portion associated with the received write request to, for example, LBA20 of the flash storage device 3-4. This data portion is an update data portion to be written to the global LBA3. Since the local LBA corresponding to the global LBA3 is indicative of the flash storage device 3-2, this data portion is an update data portion corresponding to the data portion already written to the flash storage device 3-2. Therefore, the update data portion corresponding to the data portion already stored in the flash storage device 3-2 is written to LBA20 of the flash storage device 3-4. Then, the storage location management unit 431 updates the LUT entry corresponding to the global LBA3 and changes the local LBA mapped to the global LBA3 from (device ID=#2, device LBA=60) to (device ID=#4, device LBA=20). Furthermore, the storage location management unit 431 sends a trim command to invalidate the data portion of the device LBA=60 to the flash storage device 3-2.

When the storage location management unit 431 receives the write request to request writing the data portion to the global LBA4 from the host software, the storage location management unit 431 writes the data portion associated with the received write request to, for example, LBA30 of the flash storage device 3-4. This data portion is an update data portion to be written to the global LBA4. Since the local LBA corresponding to the global LBA4 is indicative of the flash storage device 3-1, this data portion is an update data portion corresponding to the data portion already written to the flash storage device 3-1. Therefore, the update data portion corresponding to the data portion already stored in the flash storage device 3-1 is written to LBA30 of the flash storage device 3-4. Then, the storage location management unit 431 updates the LUT entry corresponding to the global LBA4 and changes the local LBA mapped to the global LBA4 from (device ID=#1, device LBA=200) to (device ID=#4, device LBA=30). Furthermore, the storage location management unit 431 may send a trim command to invalidate the data portion of the device LBA=200 to the flash storage device 3-1.

When the storage location management unit 431 receives the write request to request writing the data portion to the global LBA5 from the host software, the storage location management unit 431 writes the data portion associated with the received write request to, for example, LBA40 of the flash storage device 3-4. This data portion is an update data portion to be written to the global LBA5. Since the local LBA corresponding to the global LBA5 is indicative of the flash storage device 3-3, this data portion is an update data portion corresponding to the data portion already written to the flash storage device 3-3. Therefore, the update data portion corresponding to the data portion already stored in the flash storage device 3-3 is written to LBA40 of the flash storage device 3-4. Then, the storage location management unit 431 updates the LUT entry corresponding to the global LBA5 and changes the local LBA mapped to the global LBA5 from (device ID=#3, device LBA=500) to (device ID=#4, device LBA=40). Furthermore, the storage location management unit 431 may send a trim command to invalidate the data portion of the device LBA=500 to the flash storage device 3-3.

Figure 11:
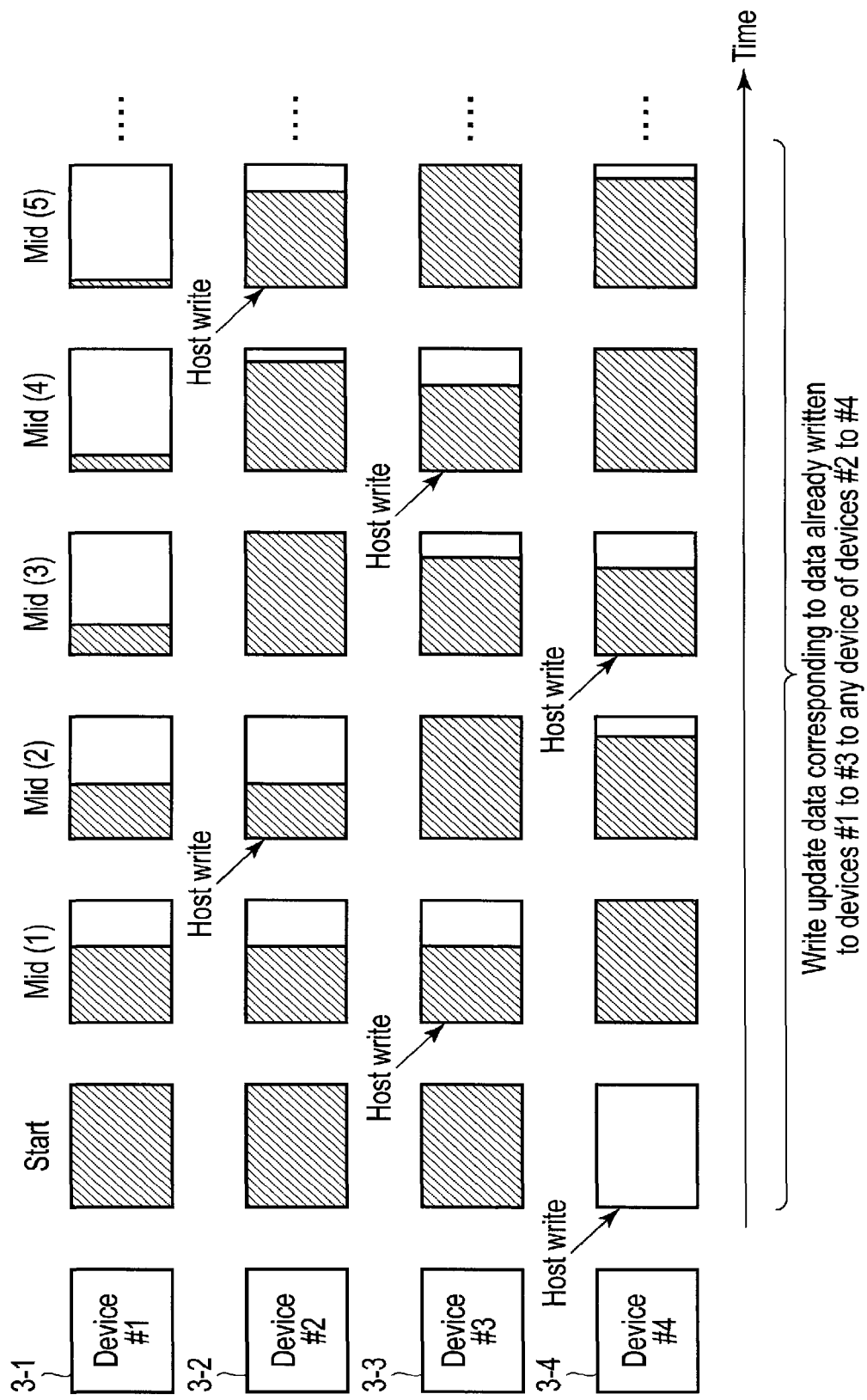
FIG. 11 is a diagram illustrating an example of processing of writing update data corresponding to data already written to the storage devices (#1 to #3) to any storage device selected from the storage devices (#2 to #4).

FIG. 11 illustrates an example of processing of writing each of the update data portions corresponding to the respective data portions already stored in the flash storage devices 3-1 to 3-3 to any flash storage device selected from the flash storage devices 3-2 to 3-4.

It is assumed that a policy of writing the data portion with priority to the flash storage device having the free region of the largest size is applied.

The NAND flash memory of each of the flash storage devices 3-1 to 3-3 is substantially full of data, for example, immediately after (Start) the flash storage device 3-4 is additionally connected to the host 2. The NAND flash memory of the flash storage device 3-4 includes a free region of a large size (a number of free blocks).

The host side storage controller 43 receives each of the write requests designating the respective global LBAs from the host 2 (host software) and writes each of the data portions associated with the write requests to the NAND flash memory of the flash storage device 3-4. Thus, each of the update data portions corresponding to the respective data portions already stored in the flash storage device 3-1 is written to the flash storage device 3-4. Furthermore, each of the update data portions corresponding to the respective data portions already stored in the flash storage devices 3-2 to 3-3 is also written to the flash storage device 3-4.

When the flash storage device 3-4 becomes substantially full of data (middle state: Mid(1)), the amount of the valid data stored in the flash storage device 3-1 is decreased. Similarly, the amount of the valid data stored in each of the flash storage devices 3-2 and 3-3 is also decreased. The free region is thereby secured in each of the flash storage devices 3-2 and 3-3. The host side storage controller 43 receives each of the subsequent write requests designating the respective global LBAs from the host 2 (host software) and writes each of the data portions associated with the subsequent write requests to the NAND flash memory of the flash storage device 3-3. Thus, each of the update data portions corresponding to the respective data portions already stored in the flash storage device 3-1 is written to the flash storage device 3-3. Furthermore, each of the update data portions corresponding to the respective data portions already stored in the flash storage devices 3-2, 3-3, and 3-4 is also written to the flash storage device 3-3.

When the flash storage device 3-3 becomes substantially full of data (middle state: Mid(2)), the amount of the valid data stored in the flash storage device 3-1 is further decreased. Similarly, the amount of the valid data stored in the flash storage device 3-2 is also further decreased. The free region of a large size is thereby secured in the flash storage device 3-2. The amount of the valid data stored in the flash storage device 3-4 is also decreased. The host side storage controller 43 receives each of the subsequent write requests designating the respective global LBAs from the host 2 (host software) and writes each of the data portions associated with the subsequent write requests to the NAND flash memory of the flash storage device 3-2. Thus, each of the update data portions corresponding to the respective data portions already stored in the flash storage device 3-1 is written to the flash storage device 3-2. Furthermore, each of the update data portions corresponding to the respective data portions already stored in the flash storage devices 3-2, 3-3, and 3-4 is also written to the flash storage device 3-2.

When the flash storage device 3-2 becomes substantially full of data (middle state: Mid(3)), the amount of the valid data stored in the flash storage device 3-1 is further decreased. Similarly, the amount of the valid data stored in the flash storage device 3-3 is also decreased. Similarly, the amount of the valid data stored in the flash storage device 3-4 is also decreased. The free region of a sufficient size is thereby secured in the flash storage device 3-4. The host side storage controller 43 receives each of the subsequent write requests designating the respective global LBAs from the host 2 (host software) and writes each of the data portions associated with the subsequent write requests to the NAND flash memory of the flash storage device 3-4. Thus, each of the update data portions corresponding to the respective data portions already stored in the flash storage device 3-1 is written to the flash storage device 3-4. Furthermore, each of the update data portions corresponding to the respective data portions already stored in the flash storage devices 3-2, 3-3, and 3-4 is also written to the flash storage device 3-4.

When the flash storage device 3-4 becomes substantially full of data (middle state: Mid(4)), the amount of the valid data stored in the flash storage device 3-1 is further decreased. Similarly, the amount of the valid data stored in the flash storage device 3-2 is also decreased. Similarly, the amount of the valid data stored in the flash storage device 3-3 is also decreased. The free region of a sufficient size is thereby secured in the flash storage device 3-3. The host side storage controller 43 receives each of the subsequent write requests designating the respective global LBAs from the host 2 (host software) and writes each of the data portions associated with the subsequent write requests to the NAND flash memory of the flash storage device 3-3. Thus, each of the update data portions corresponding to the respective data portions already stored in the flash storage device 3-1 is written to the flash storage device 3-3. Furthermore, each of the update data portions corresponding to the respective data portions already stored in the flash storage devices 3-2, 3-3, and 3-4 is also written to the flash storage device 3-3.

When the flash storage device 3-3 becomes substantially full of data (middle state: Mid(5)), the amount of the valid data stored in the flash storage device 3-1 is further decreased. Similarly, the amount of the valid data stored in the flash storage device 3-2 is also decreased. The free region is thereby secured in each of the flash storage device 3-2. Similarly, the amount of the valid data stored in the flash storage device 3-4 is also decreased. The host side storage controller 43 receives each of the subsequent write requests designating the respective global LBAs from the host 2 (host software) and writes each of the data portions associated with the subsequent write requests to the NAND flash memory of the flash storage device 3-2. Thus, each of the update data portions corresponding to the respective data portions already stored in the flash storage device 3-1 is written to the flash storage device 3-2. Furthermore, each of the update data portions corresponding to the respective data portions already stored in the flash storage devices 3-2, 3-3, and 3-4 is also written to the flash storage device 3-2.

Thus, writing the data to the flash storage device 3-4, writing the data to the flash storage device 3-3, writing the data to the flash storage device 3-2, writing the data to the flash storage device 3-4, . . . , may be repeated. When all of the data already written to the flash storage device 3-1 are updated, the amount of the valid data stored in the flash storage device 3-1 has become zero and the flash storage device 3-1 becomes able to be removed from the host 2.

Thus, in the embodiments, the host side storage controller 43 writes each of the data portions associated with the respective write requests received from the host 2 (host software) to any flash storage device of the flash storage devices 3-2 to 3-4. The processing of writing each of the update data portions corresponding to the respective data portions already written to the flash storage device 3-1, and each of the update data portions corresponding to the respective data portions already written to the flash storage device 3-2 and 3-3, to the flash storage device 3-4 can be thereby executed. Furthermore, the free regions can be secured in the flash storage devices 3-2 to 3-3. Therefore, since this free region can be used, the processing of writing each of the subsequent update data portions corresponding to the respective data portions already written to the flash storage device 3-1, and each of the subsequent update data portions corresponding to the respective data portions already written to the flash storage device 3-2 and 3-3, to the flash storage device 3-2 or 3-3 can be executed.

Figure 12:
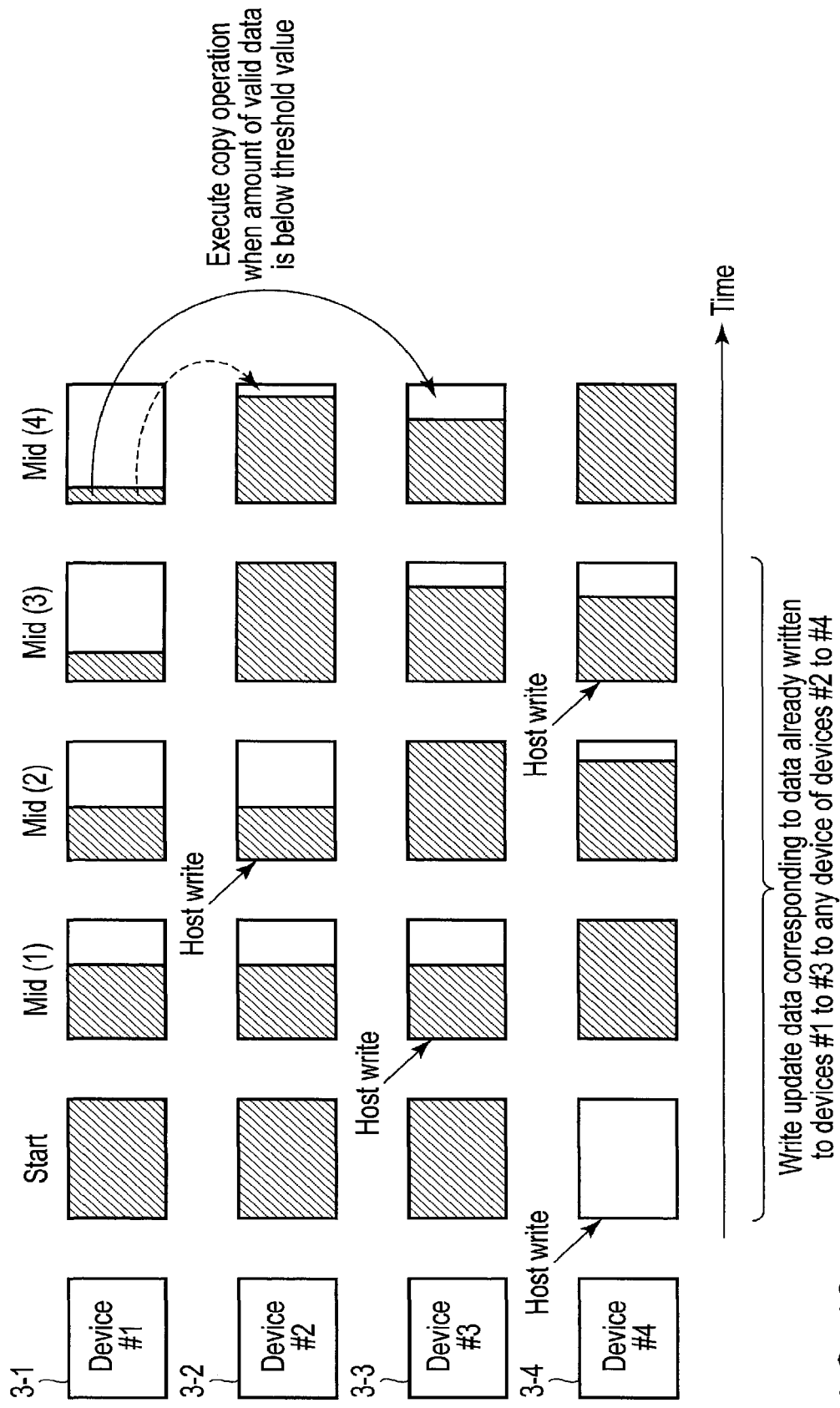
FIG. 12 is a diagram illustrating an example of processing of writing an update data portion corresponding to each of data portions already written to the storage devices (#1 to #3) to any storage device selected from the storage devices (#2 to #4) and, in a case where a valid data amount of the storage device (#1) is reduced to a permissible amount, an example of processing of copying the valid data to any storage device selected from the storage devices (#2 to #4).

FIG. 12 illustrates an example of processing of writing each of the update data portions corresponding to the respective data portions already written to the flash storage devices 3-1 to 3-3 to any storage device selected from the flash storage devices 3-2 to 3-4, and an example of processing of copying the valid data to any flash storage device selected from the flash storage devices 3-2 to 3-4 in a case where the amount of the valid data stored in the flash storage device 3-1 is decreased to the permissible amount.

Operations executed in a period from Start to Mid(4) in FIG. 12 are the same as the operations executed in the period from Start to Mid(4) as described with reference to FIG. 11. At each of Mid(1), Mid(2), and Mid(3) in FIG. 12, the amount of the valid data stored in the flash storage device 3-1 is more than the permissible amount. At Mid(4), the amount of the valid data stored in the flash storage device 3-1 is decreased to the permissible amount. In this case, the host side storage controller 43 copies the valid data stored in the flash storage device 3-1 to any flash storage device selected from the flash storage devices 3-2 to 3-4. In this case, the whole valid data stored in the flash storage device 3-1 may be copied to a flash storage device selected from the flash storage devices 3-2 to 3-4, or part of the valid data may be copied to a flash storage device selected from the flash storage devices 3-2 to 3-4 and the remaining parts of the valid data may be copied to the other flash storage device selected from the flash storage devices 3-2 to 3-4.

Thus, when the amount of the valid data in the flash storage device 3-1 is decreased to the permissible quantity, the processing of copying this valid data to any flash storage device selected from the flash storage devices 3-2 to 3-4 is executed. Therefore, the increase in the amount of data required to be written to the storage system is suppressed to the minimum level. The degradation in performance of the storage system seen from the host 2 can be thereby suppressed.

Figure 13:
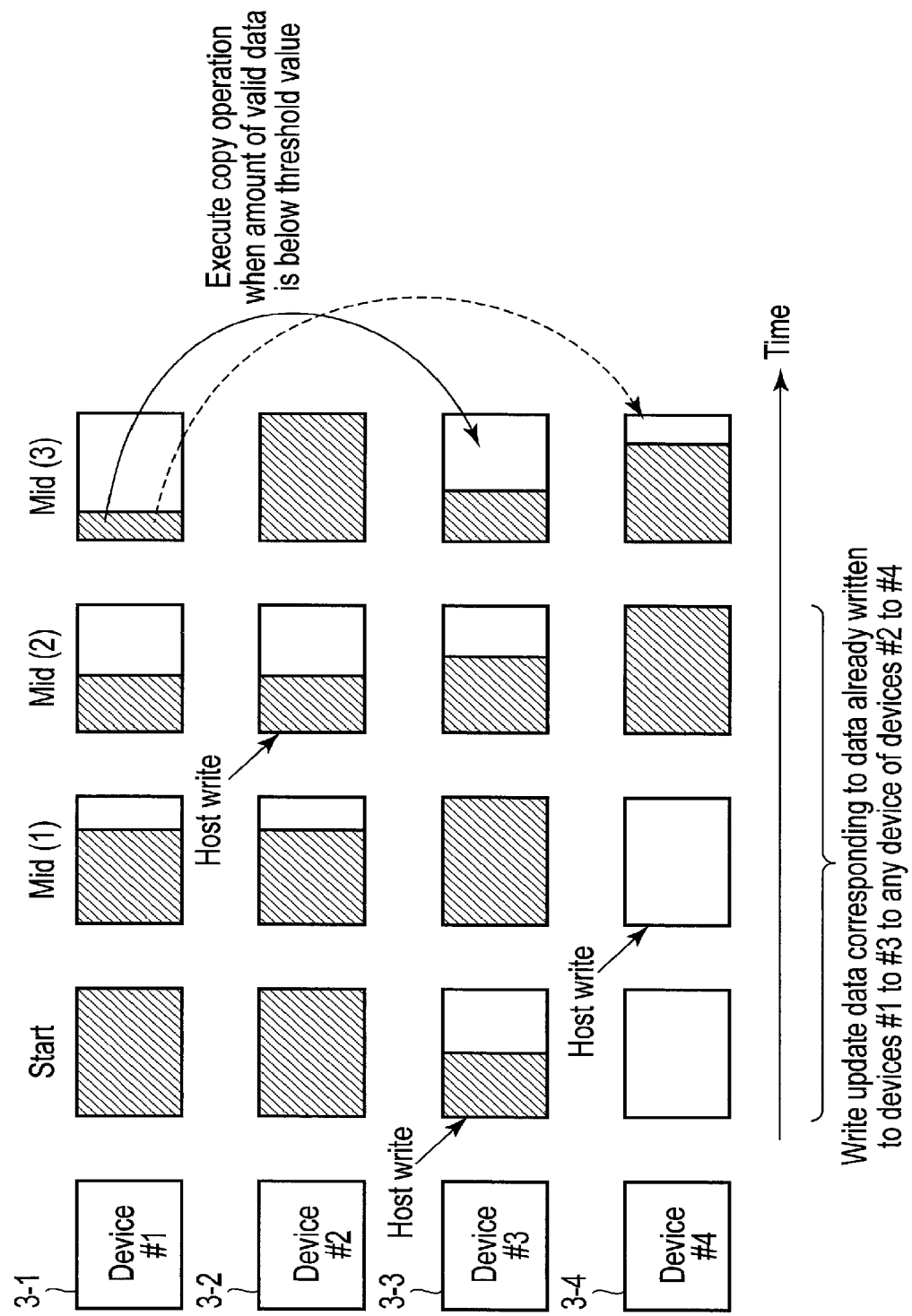
FIG. 13 is a diagram illustrating another example of processing of writing an update data part corresponding to each of data portions already written to the storage devices (#1 to #3) to any storage device selected from the storage devices (#2 to #4).

FIG. 13 illustrates another example of processing of writing each of the update data portions corresponding to the respective data portions already written to the flash storage devices 3-1 to 3-3 to any flash storage device selected from the flash storage devices 3-2 to 3-4.

It is assumed that immediately after (Start) the flash storage device 3-4 is additionally connected to the host 2, a free region having a size larger than or equal to a certain size is present in the flash storage device 3-3.

In this case, the host side storage controller 43 may write each of the data portions associated with the respective write requests received from the host 2 (host software) to the NAND flash memory of the flash storage device 3-3. Thus, each of the update data portions corresponding to the respective data portions already stored in the flash storage device 3-1 is written to the flash storage device 3-3. Furthermore, each of the update data portions corresponding to the respective data portions already stored in the flash storage devices 3-2 to 3-3 is also written to the flash storage device 3-3.

When the flash storage device 3-3 becomes substantially full of data (middle state: Mid(1)), the amount of the valid data stored in the flash storage device 3-1 is decreased. Similarly, the amount of the valid data stored in the flash storage device 3-2 is also decreased. The host side storage controller 43 receives each of the subsequent write requests designating the respective global LBAs from the host 2 (host software) and writes each of the data portions associated with the subsequent write requests to the NAND flash memory of the flash storage device 3-4. Thus, each of the update data portions corresponding to the respective data portions already stored in the flash storage device 3-1 is written to the flash storage device 3-4. Furthermore, each of the update data portions corresponding to the respective data portions already stored in the flash storage devices 3-2 to 3-3 is also written to the flash storage device 3-4.

When the flash storage device 3-4 becomes substantially full of data (middle state: Mid(2)), the amount of the valid data stored in the flash storage device 3-1 is further decreased. Similarly, the amount of the valid data stored in the flash storage device 3-2 is also further decreased. The free region of a large size is thereby secured in the flash storage device 3-2. Similarly, the amount of the valid data stored in the flash storage device 3-3 is also decreased. The host side storage controller 43 receives each of the subsequent write requests designating the respective global LBAs from the host 2 (host software) and writes each of the data portions associated with the subsequent write requests to the NAND flash memory of the flash storage device 3-2. Thus, each of the update data portions corresponding to the respective data portions already stored in the flash storage device 3-1 is written to the flash storage device 3-2. Furthermore, each of the update data portions corresponding to the respective data portions already stored in the flash storage devices 3-2, 3-3, and 3-4 is also written to the flash storage device 3-2.

When the flash storage device 3-2 becomes substantially full of data (middle state: Mid(3)), the amount of the valid data stored in the flash storage device 3-1 is decreased to the permissible amount. In this case, the host side storage controller 43 copies the valid data stored in the flash storage device 3-1 to any flash storage device selected from the flash storage devices 3-2 to 3-4. In this case, the whole valid data stored in the flash storage device 3-1 may be copied to a flash storage device selected from the flash storage devices 3-2 to 3-4, or part of the valid data may be copied to a flash storage device selected from the flash storage devices 3-2 to 3-4 and the remaining parts of the valid data may be copied to the other flash storage device selected from the flash storage devices 3-2 to 3-4.

Figure 14:
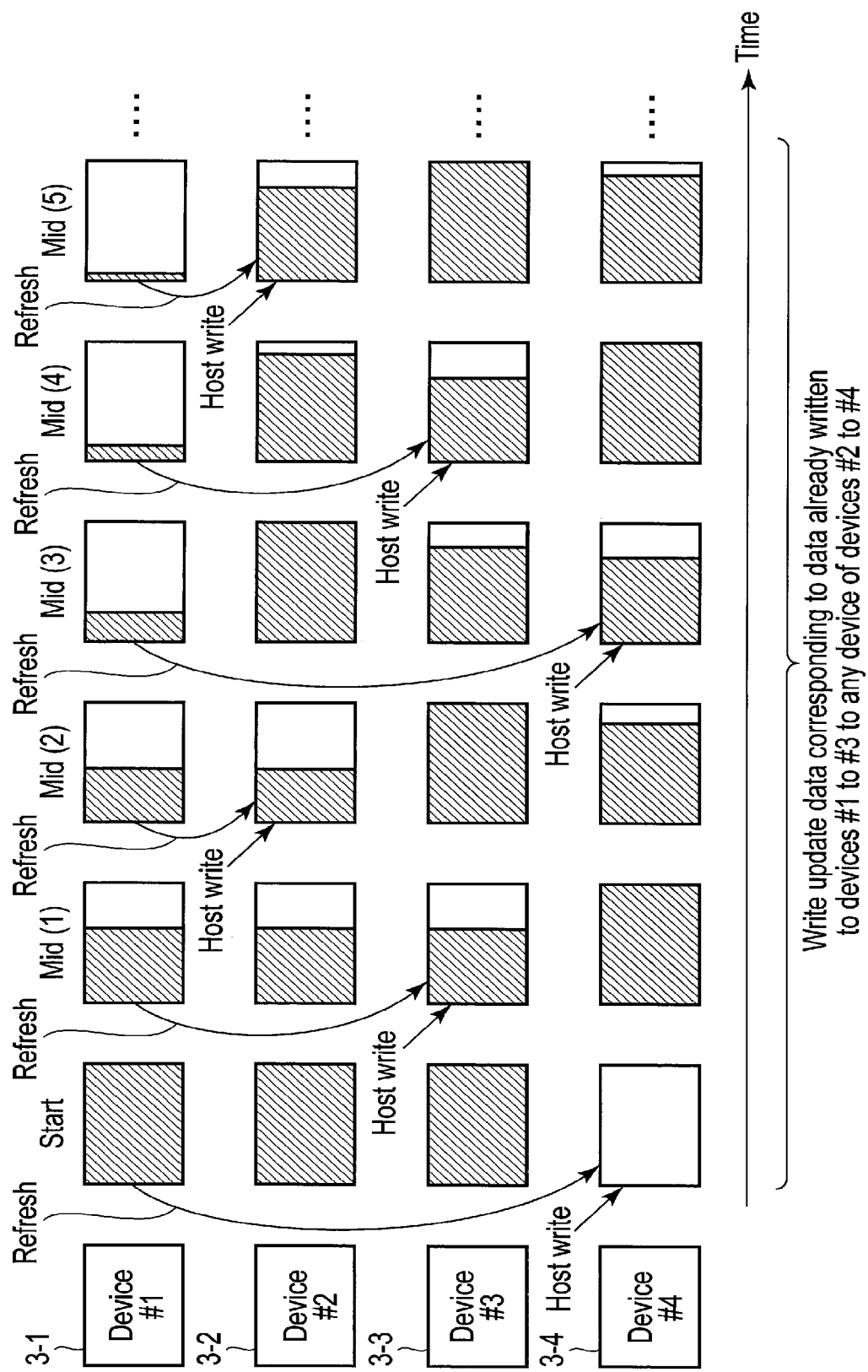
FIG. 14 is a diagram illustrating an example of processing of writing an update data portion corresponding to each of data portions already written to the storage devices (#1 to #3) to any storage device selected from the storage devices (#2 to #4), and an example of processing of copying the valid data in each refresh target detected by the refresh operation of the storage device (#1) to the other storage device.

FIG. 14 illustrates an example of processing of writing each of the update data portions corresponding to the respective data portions already written to the flash storage devices 3-1 to 3-3 to an any storage device selected from the flash storage devices 3-2 to 3-4, and an example of processing of copying the valid data in each of the blocks to be refreshed detected by the refresh operation of the flash storage device 3-1 to the other storage device.

Immediately after (Start) the flash storage device 3-4 is additionally connected to the host 2, the host side storage controller 43 receives each of the write requests designating the respective global LBAs from the host 2 (host software) and writes each of the data portions associated with the write requests to the NAND flash memory of the flash storage device 3-4. Thus, each of the update data portions corresponding to the respective data portions already stored in the flash storage device 3-1 is written to the flash storage device 3-4. Furthermore, each of the update data portions corresponding to the respective data portions already stored in the flash storage devices 3-2 to 3-3 is also written to the flash storage device 3-4. In addition, when the host side storage controller 43 receives the refresh request from the flash storage device 3-1, the host side storage controller 43 writes the valid data in the block to be refreshed detected by the flash storage device 3-1 to the NAND flash memory of the flash storage device 3-4.

When the flash storage device 3-4 becomes substantially full of data (middle state: Mid(1)), the amount of the valid data stored in the flash storage device 3-1 is decreased. Similarly, the amount of the valid data stored in the flash storage devices 3-2 and 3-3 is also decreased. The free region is thereby secured in each of the flash storage devices 3-2 and 3-3. The host side storage controller 43 receives each of the subsequent write requests designating the respective global LBAs from the host 2 (host software) and writes each of the data portions associated with the subsequent write requests to the NAND flash memory of the flash storage device 3-3. Thus, each of the update data portions corresponding to the respective data portions already stored in the flash storage device 3-1 is written to the flash storage device 3-3. Furthermore, each of the update data portions corresponding to the respective data portions already stored in the flash storage devices 3-2, 3-3, and 3-4 is also written to the flash storage device 3-3. In addition, when the host side storage controller 43 receives the refresh request from the flash storage device 3-1, the host side storage controller 43 writes the valid data in the block to be refreshed detected by the flash storage device 3-1 to the NAND flash memory of the flash storage device 3-3.

When the flash storage device 3-3 becomes substantially full of data (middle state: Mid(2)), the amount of the valid data stored in the flash storage device 3-1 is further decreased. Similarly, the amount of the valid data stored in the flash storage device 3-2 is also further decreased. The free region of a large size is thereby secured in the flash storage device 3-2. The amount of the valid data stored in the flash storage device 3-4 is also decreased. The host side storage controller 43 receives each of the subsequent write requests designating the respective global LBAs from the host 2 (host software) and writes each of the data portions associated with the subsequent write requests to the NAND flash memory of the flash storage device 3-2. Thus, each of the update data portions corresponding to the respective data portions already stored in the flash storage device 3-1 is written to the flash storage device 3-2. Furthermore, each of the update data portions corresponding to the respective data portions already stored in the flash storage devices 3-2, 3-3, and 3-4 is also written to the flash storage device 3-2. In addition, when the host side storage controller 43 receives the refresh request from the flash storage device 3-1, the host side storage controller 43 writes the valid data in the block to be refreshed detected by the flash storage device 3-1 to the NAND flash memory of the flash storage device 3-2.

When the flash storage device 3-2 becomes substantially full of data (middle state: Mid(3)), the amount of the valid data stored in the flash storage device 3-1 is further decreased. Similarly, the amount of the valid data stored in the flash storage device 3-3 is also decreased. Similarly, the amount of the valid data stored in the flash storage device 3-4 is also decreased. The free region of a sufficient size is thereby secured in the flash storage device 3-4. The host side storage controller 43 receives each of the subsequent write requests designating the respective global LBAs from the host 2 (host software) and writes each of the data portions associated with the subsequent write requests to the NAND flash memory of the flash storage device 3-4. Thus, each of the update data portions corresponding to the respective data portions already stored in the flash storage device 3-1 is written to the flash storage device 3-4. Furthermore, each of the update data portions corresponding to the respective data portions already stored in the flash storage devices 3-2, 3-3, and 3-4 is also written to the flash storage device 3-4. In addition, when the host side storage controller 43 receives the refresh request from the flash storage device 3-1, the host side storage controller 43 writes the valid data in the block to be refreshed detected by the flash storage device 3-1 to the NAND flash memory of the flash storage device 3-4.

When the flash storage device 3-4 becomes substantially full of data (middle state: Mid(4)), the amount of the valid data stored in the flash storage device 3-1 is further decreased. Similarly, the amount of the valid data stored in the flash storage device 3-2 is also decreased. Similarly, the amount of the valid data stored in the flash storage device 3-3 is also decreased. The free region of a sufficient size is thereby secured in the flash storage device 3-3. The host side storage controller 43 receives each of the subsequent write requests designating the respective global LBAs from the host 2 (host software) and writes each of the data portions associated with the subsequent write requests to the NAND flash memory of the flash storage device 3-3. Thus, each of the update data portions corresponding to the respective data portions already stored in the flash storage device 3-1 is written to the flash storage device 3-3. Furthermore, each of the update data portions corresponding to the respective data portions already stored in the flash storage devices 3-2, 3-3, and 3-4 is also written to the flash storage device 3-3. In addition, when the host side storage controller 43 receives the refresh request from the flash storage device 3-1, the host side storage controller 43 writes the valid data in the block to be refreshed detected by the flash storage device 3-1 to the NAND flash memory of the flash storage device 3-3.

When the flash storage device 3-3 becomes substantially full of data (middle state: Mid(5)), the amount of the valid data stored in the flash storage device 3-1 is further decreased. Similarly, the amount of the valid data stored in the flash storage device 3-2 is also decreased. The free region is thereby secured in each of the flash storage device 3-2. Similarly, the amount of the valid data stored in the flash storage device 3-4 is also decreased. The host side storage controller 43 receives each of the subsequent write requests designating the respective global LBAs from the host 2 (host software) and writes each of the data portions associated with the subsequent write requests to the NAND flash memory of the flash storage device 3-2. Thus, each of the update data portions corresponding to the respective data portions already stored in the flash storage device 3-1 is written to the flash storage device 3-2. Furthermore, each of the update data portions corresponding to the respective data portions already stored in the flash storage devices 3-2, 3-3, and 3-4 is also written to the flash storage device 3-2. In addition, when the host side storage controller 43 receives the refresh request from the flash storage device 3-1, the host side storage controller 43 writes the valid data in the block to be refreshed detected by the flash storage device 3-1 to the NAND flash memory of the flash storage device 3-2.

Thus, not only the data portions associated with the respective write requests, but the valid data in the block to be refreshed included in the flash storage device 3-1 are written to the flash storage devices 3-2 to 3-4. Therefore, the amount of valid data stored in the flash storage device 3-1 becomes to zero at earlier timing of the timing of ending a refresh period of the flash storage device 3-1 and the timing of completing update of all data already written in the flash storage device 3-1, under the circumstance that the flash storage device 3-1 is degraded, and the flash storage device 3-1 can be removed from the host 2.

If the amount of the valid data in the flash storage device 3-1 is decreased to the permissible amount, the processing of copying the valid data to any flash storage device selected from the flash storage devices 3-2 to 3-4 may be applied to the operation of FIG. 14, as described with reference to FIG. 12 or FIG. 13.

Figure 15:
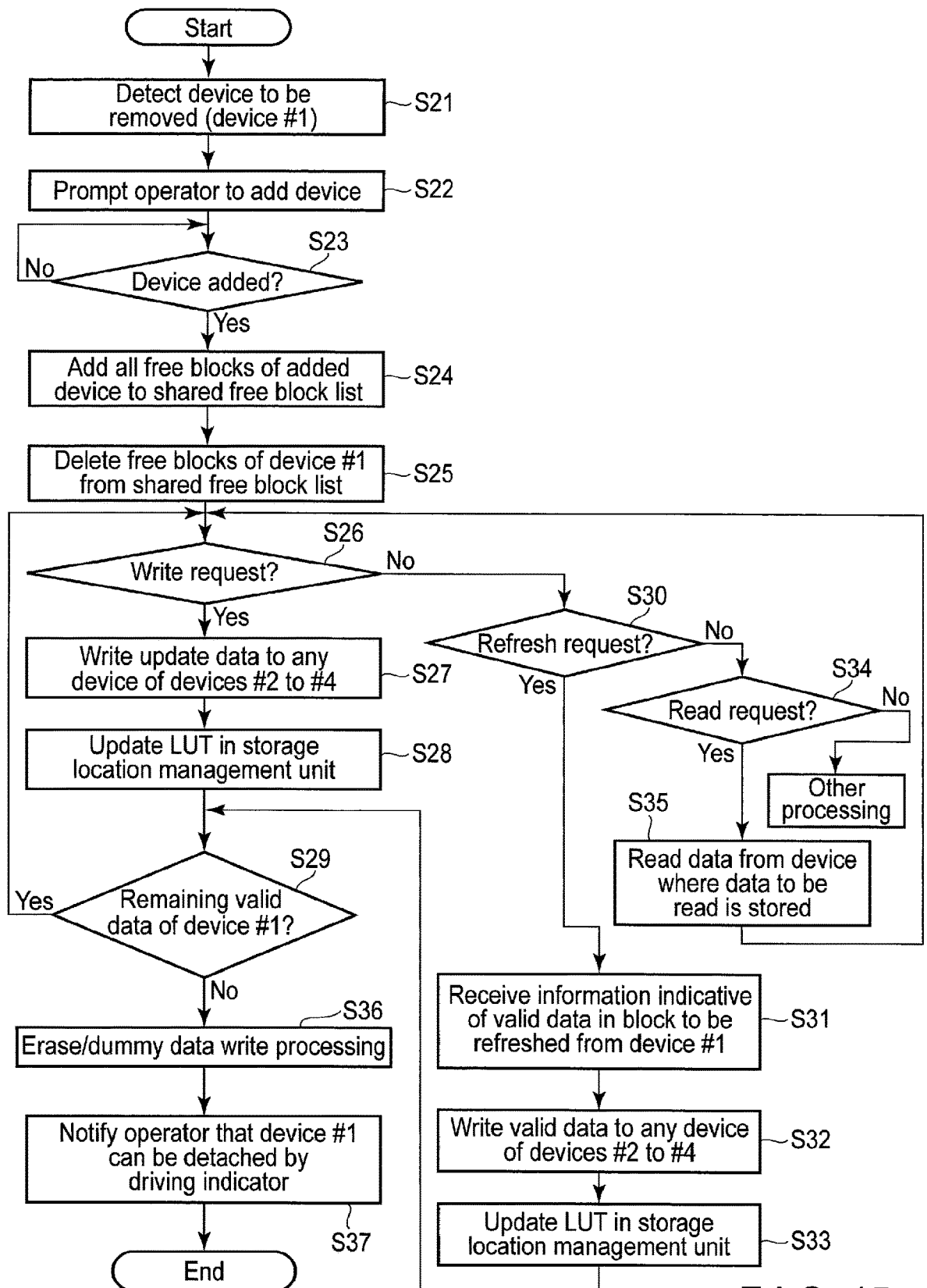
FIG. 15 is a flowchart illustrating a procedure of write/copy/read processing executed by a storage controller (host side storage controller) of a host device.

A flowchart of FIG. 15 illustrates a procedure of write/copy/read processing executed by the host side storage controller 43.

For example, the host side storage controller 43 monitors the number of defective blocks included in each of the flash storage devices 3-1 to 3-3 and detects the flash storage device in which the number of defective blocks exceeds a certain threshold value as the flash storage device to be removed (step S21). If the flash storage device to be removed is detected (e.g., flash storage device 3-1), the host side storage controller 43 may prompt the operator to add a flash storage device (step S22).

When the flash storage device 3-4 is connected to the host side storage controller 43 (YES in step S23), the host side storage controller 43 adds all of the free blocks of the flash storage device 3-4 to the shared free block list 432A (step S24) and deletes each of the free blocks of the flash storage device 3-1 from the shared free block list 432A (step S25). In step S25, the host side storage controller 43 also executes processing of setting the operation mode of the flash storage device 3-1 to the write inhibit mode.

If the host side storage controller 43 receives the write request to designate a specific global LBA from the host 2 (host software) (YES in step S26), the host side storage controller 43 determines the write destination flash storage device of the flash storage devices 3-2 to 3-4 and further determines the write destination device LBA in the write destination flash storage device. The write destination flash storage device is a flash storage device to which the data portion associated with the received write request is to be written. In addition, the write destination device LBA in the write destination flash storage device is indicative of the logical storage location to which the data portion is to be written.

Then, the host side storage controller 43 writes this data portion to any flash storage device of the flash storage devices 3-2 to 3-4 by sending the write command to write this data portion to the write destination flash storage device (step S27). This write command includes the above specific global LBA, the write destination device LBA, and the data length.

The host side storage controller 43 updates LUT 431A and associates new local LBA (identifier of the write destination flash storage device and write destination device LBA) with the above specific global LBA (step S28). Furthermore, the host side storage controller 43 may send a trim command including a device LBA indicated by previous local LBA to a flash storage device indicated by the previous local LBA associated with the above specific global LBA.

The host side storage controller 43 determines whether or not remaining valid data is present in the flash storage device 3-1 by referring to LUT 431A (step S29).

If the remaining valid data is present in the flash storage device 3-1 (YES in step S29), the processing of the host side storage controller 43 returns to a process of step S26.

If the host side storage controller 43 receives the refresh request from the flash storage device 3-1 (YES in step S30), the host side storage controller 43 receives information indicative of the valid data in the block to be refreshed from the flash storage device 3-1 (step S31). The information indicative of the valid data in the block to be refreshed includes the global LBA corresponding to the valid data.

The host side storage controller 43 may determine whether the current local LBA associated with the global LBA is indicative of the flash storage device 3-1 or not, by referring to LUT 431A using the global LBA.

If the current local LBA associated with this global LBA is not indicative of the flash storage device 3-1, the host side storage controller 43 does not execute the processing of copying the valid data to the other flash storage device since the update data corresponding to the global LBA is already written to the other flash storage device.

If the current local LBA associated with this global LBA is indicative of the flash storage device 3-1, the host side storage controller 43 determines a copy destination flash storage device of the flash storage devices 3-2 to 3-4 and further determines a copy destination device LBA in the copy destination flash storage device.

Next, the host side storage controller 43 reads the valid data from the flash storage device 3-1 by sending a read command including the device LBA in the current local LBA associated with the global LBA to the flash storage device 3-1. The valid data is valid data error-corrected by the flash storage device 3-1. Then, the host side storage controller 43 sends the write command to write the read valid data to the copy destination flash storage device. The host side storage controller 43 can thereby write (copy) the valid data to any flash storage device of the flash storage devices 3-2 to 3-4 (step S32). This write command includes the above specific global LBA, the copy destination device LBA, and the data length.

The host side storage controller 43 updates LUT 431A and associates new local LBA (identifier of the copy destination flash storage device and copy destination device LBA) with the above specific global LBA (step S33).

The host side storage controller 43 determines whether remaining valid data is present in the flash storage device 3-1 or not by referring to LUT 431A (step S29).

If the remaining valid data is present in the flash storage device 3-1 (YES in step S29), the processing of the host side storage controller 43 returns to a process of step S26.

If the host side storage controller 43 receives the read request to designate a specific global LBA from the host 2 (host software) (YES in step S34), the host side storage controller 43 reads read data from the flash storage device where the data to be read is stored (step S35). In step S35, the host side storage controller 43 first acquires the local LBA (or physical address) associated with the specific global LBA from LUT 431A. Then, the host side storage controller 43 sends the read command including the device LBA included in the acquired local LBA, to the flash storage device indicated by device ID included in the acquired local LBA.

If the remaining valid data is not present in the flash storage device 3-1 (NO in step S29), the processing of the host side storage controller 43 proceeds to step S36.

In step S36, the host side storage controller 43 may send an erase command for instructing to perform an erase operation on each of the blocks in the NAND flash memory of the flash storage device 3-1, to the flash storage device 3-1. Furthermore, the host side storage controller 43 may write predetermined data (dummy data) to each of the blocks where the erase operation is executed, in the flash storage device 3-1.

Then, the host side storage controller 43 drives an indicator (LED 52 disposed in a slot to which the flash storage device 3-1 is attached) configured to indicate that the flash storage device 3-1 can be removed, and notifies the operator that the flash storage device 3-1 can be removed (step S37). When the operator removes the flash storage device 3-1 from the slot 51, this slot 51 becomes a free slot to which the additional flash storage device can be connected.

A flowchart of FIG. 16 illustrates another procedure of write/copy/read processing executed by the host side storage controller 43.

A procedure illustrated by the flowchart of FIG. 16 is different from the procedure illustrated by the flowchart of FIG. 15 with respect to an element of executing processing in step S100 instead of the processing in step S29 of FIG. 15 and an element of executing processing in step S101 between the processing in step S100 and the processing in step S36, and is the same as the procedure illustrated by the flowchart of FIG. 15 with respect to the other elements.

In step S100, the host side storage controller 43 determines whether or not the amount of the remaining valid data of the flash storage device 3-1 is below threshold value Th1 corresponding to the above permissible amount.

If the amount of remaining valid data of the flash storage device 3-1 is not below the threshold value Th1 (NO in step S100), the processing of the host side storage controller 43 returns to a process of step S26.

If the amount of remaining valid data of the flash storage device 3-1 is below the threshold value Th1 (YES in step S100), the host side storage controller 43 copies the remaining valid data of the flash storage device 3-1 to the flash storage device selected from the flash storage devices 3-2 to 3-4 (step S101). In step S101, the host side storage controller 43 further updates LUT 431A and associates copy destination local LBA (identifier of the copy destination flash storage device and copy destination device LBA) with the global LBA corresponding to the remaining valid data.

The host side storage controller 43 may receive the information indicative of all of the global LBAs corresponding to the remaining valid data from the flash storage device 3-1. In this case, in step S101, the host side storage controller 43 may execute the following processing for each of the received global LBAs.

The host side storage controller 43 may select the global LBA to be processed from the received global LBAs and determine whether the current local LBA associated with the selected global LBA is indicative of the flash storage device 3-1 or not, by referring to LUT 431A using the selected global LBA.

If the current local LBA associated with the selected global LBA is not indicative of the flash storage device 3-1, the host side storage controller 43 does not execute the processing of copying the valid data corresponding to the selected global LBA to the other flash storage device since the update data corresponding to the selected global LBA is already written to the other flash storage device.

If the current local LBA associated with this selected global LBA is indicative of the flash storage device 3-1, the host side storage controller 43 determines a copy destination flash storage device of the flash storage devices 3-2 to 3-4 and further determines a copy destination device LBA in the copy destination flash storage device.

Next, the host side storage controller 43 reads the valid data corresponding to the selected global LBA from the flash storage device 3-1 by sending the read command including the device LBA in the current local LBA associated with the selected global LBA to the flash storage device 3-1. Then, the host side storage controller 43 copies the valid data to any flash storage device of the flash storage devices 3-2 to 3-4 by sending the write command to write the read valid data to the copy destination flash storage device. This write command includes the above specific global LBA, the write destination device LBA, and the data length.

The host side storage controller 43 updates LUT 431A and associates new local LBA (identifier of the copy destination flash storage device and copy destination device LBA) with the above selected global LBA.

Figure 17:
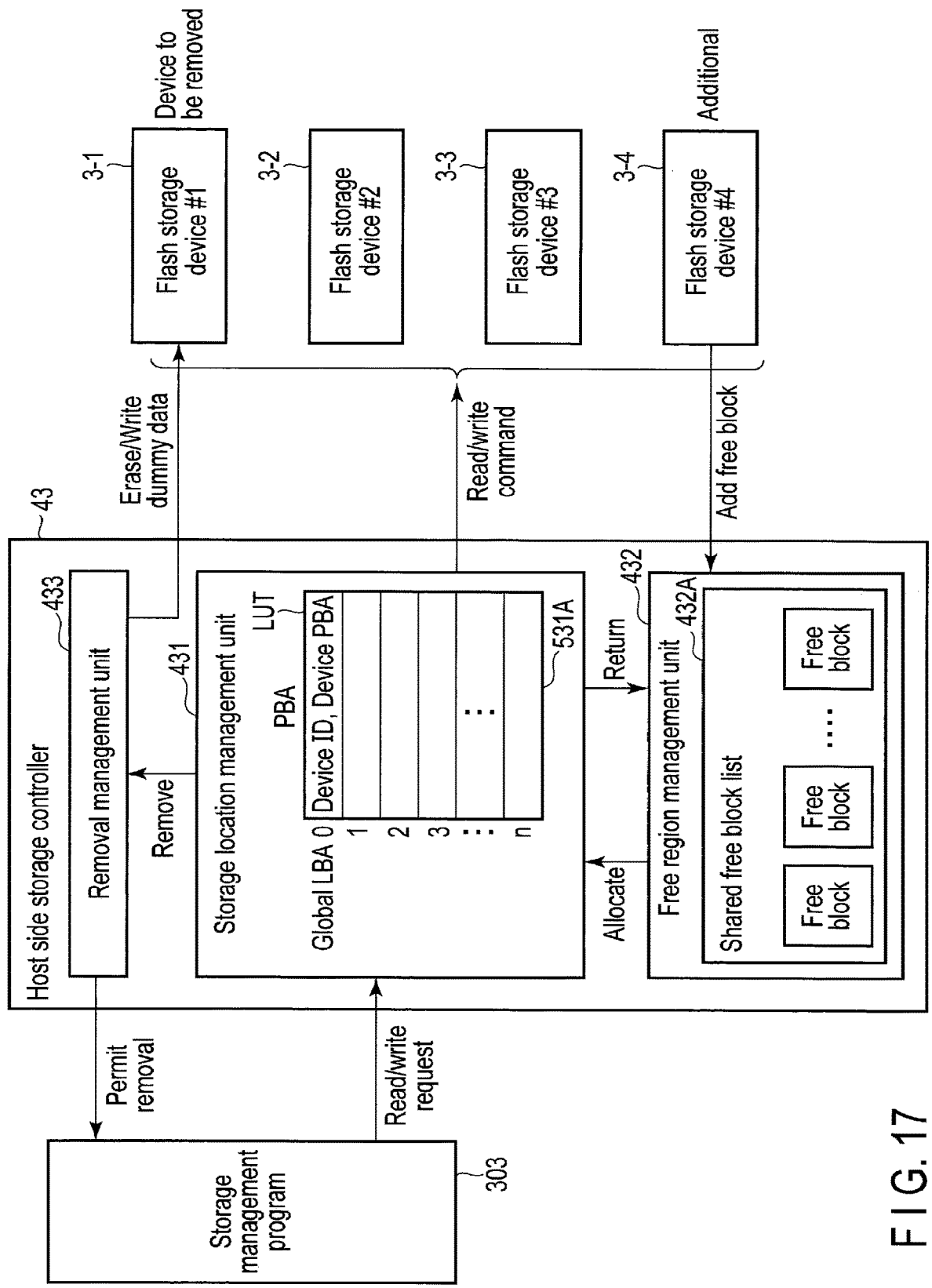
FIG. 17 is a block diagram illustrating another configuration example of the storage controller (host side storage controller) of the host device included in the information processing system of the embodiment.

FIG. 17 illustrates another configuration example of the host side storage controller 43.

In FIG. 17, the host side storage controller 43 comprises a storage location management unit 531 instead of the storage location management unit 431 in FIG. 8.

The storage location management unit 531 uses LUT 531A to manage mapping between each of the logical addresses (global LBAs) belonging to the first logical address space and each of the physical addresses indicative of the physical storage locations in the flash storage devices 3-1 to 3-3 (or flash storage devices 3-1 to 3-4) to which the data portions corresponding to the respective global LBAs are written.

LUT 531A includes entries corresponding to the respective global LBAs (global LBA0 to global LBAn). An entry corresponding to a certain global LBA stores a physical address (PBA) indicative of a specific physical storage location in a specific flash storage device where the data portion corresponding to this global LBA is stored. Each PEA includes a device ID and a device physical address (device PBA). The device ID is an identifier of a certain flash storage device. The device physical address (device PBA) is a physical address indicative of a physical storage location of the NAND flash memory in this flash storage device.

In a state in which the flash storage devices 3-1 to 3-3 are connected to the host side storage controller 43, the storage location management unit 531 writes each of the data portions corresponding to the respective global LBAs to any physical storage location in any flash storage device selected from the flash storage devices 3-1 to 3-3. More specifically, when the storage location management unit 531 receives a write request including both of a specific global LBA and a specific data length from the host software (for example, the storage management program 303), the storage location management unit 531 selects the flash storage device to which the write data portion corresponding to the specific global LBA is to be written from the flash storage devices 3-1 to 3-3 and determines the physical storage location to which the write data portion corresponding to the specific global LBA is to be written. The storage location management unit 531 sends to the selected flash storage device a write command to write the data portion. This write command may include the determined physical address and the specific data length. Furthermore, this write command may include the specific global LBA. Then, the storage location management unit 531 updates LUT 431A and associates the physical address (device ID and device PBA) indicative of the physical storage location to which this data portion is written with the specific global LBA.

The storage location management unit 531 may write each of the data portions corresponding to the respective global LBAs to any physical storage location in an any storage device selected from the flash storage devices 3-1 to 3-3 by selecting the write destination block to which the data portions are to be written from a set of the shared free blocks managed by the shared free block list 432A. The free block selected from the set of the shared free blocks is allocated as the write destination block. The flash storage device including the write destination block may be selected as the flash storage device to which the data portions are to be written. In each of the flash storage devices, if all of the data in a certain block are invalidated by overwrite/unmapping, GC, and the like, this block is returned to the shared free block list 432A. The returned block is reused as the shared free block.

Next, it is assumed that it is determined that the flash storage device 3-1 of the flash storage devices 3-1 to 3-3 should be removed due to the increase in number of the defective blocks of the flash storage device 3-1, and that the flash storage device 3-4 is connected to the host side storage controller 43.

The storage location management unit 531 controls the flash storage device 3-1 in the above-described write inhibit mode in which data write is inhibited and data read is permitted. Furthermore, the storage location management unit 531 executes write processing of decreasing the amount of the valid data stored in the flash storage device 3-1 to be removed, by writing each of the data portions corresponding to the respective global LBAs to any physical storage location in any flash storage device selected from the flash storage devices 3-2 to 3-4. In this case, each of the update data portions corresponding to the respective data portions already stored in the flash storage device 3-1 is written to the free region in any flash storage device selected from the flash storage devices 3-2, 3-3, and 3-4. Similarly, each of the update data portions corresponding to the respective data portions already stored in the flash storage device 3-2 is also written to the free region in any flash storage device selected from the flash storage devices 3-2, 3-3, and 3-4. Similarly, each of the update data portions corresponding to the respective data portions already stored in the flash storage device 3-3 is also written to the free region in any flash storage device selected from the flash storage devices 3-2, 3-3, and 3-4.

FIG. 18 illustrates processing of writing the data portions corresponding to the respective global LBAs to the storage locations (physical storage locations) in the flash storage devices 3-1 to 3-3.

As described above, the data portion associated with each of the write requests sent from the host software to the host side storage controller 43 (i.e., the data portion corresponding to each global LBA) can be written to any physical storage location in the storage system comprising the flash storage devices 3-1 to 3-3. In FIG. 18, it is assumed that the data portion corresponding to global LBA0 is written to physical address (device PBA) 100 in the flash storage device 3-1, that the data portion corresponding to global LBA1 is written to physical address (device PBA) 110 in the flash storage device 3-1, that the data portion corresponding to global LBA2 is written to physical address (device PBA) 50 in the flash storage device 3-2, that the data portion corresponding to global LBA3 is written to physical address (device PBA) 60 in the flash storage device 3-2, that the data portion corresponding to global LBA4 is written to physical address (device PEA) 200 in the flash storage device 3-1, that the data portion corresponding to global LBA5 is written to physical address (device PBA) 500 in the flash storage device 3-3, that the data portion corresponding to global LBA6 is written to physical address (device PBA) 600 in the flash storage device 3-3, that the data portion corresponding to global LBA7 is written to physical address (device PBA) 100 in the flash storage device 3-2, that the data portion corresponding to global LBA10 is written to physical address (device PBA) 10 in the flash storage device 3-2, that the data portion corresponding to global LBA11 is written to physical address (device PBA) 900 in the flash storage device 3-1, and that the data portion corresponding to global LBAn is written to physical address (device PBA) 70 in the flash storage device 3-3.

Figure 19:
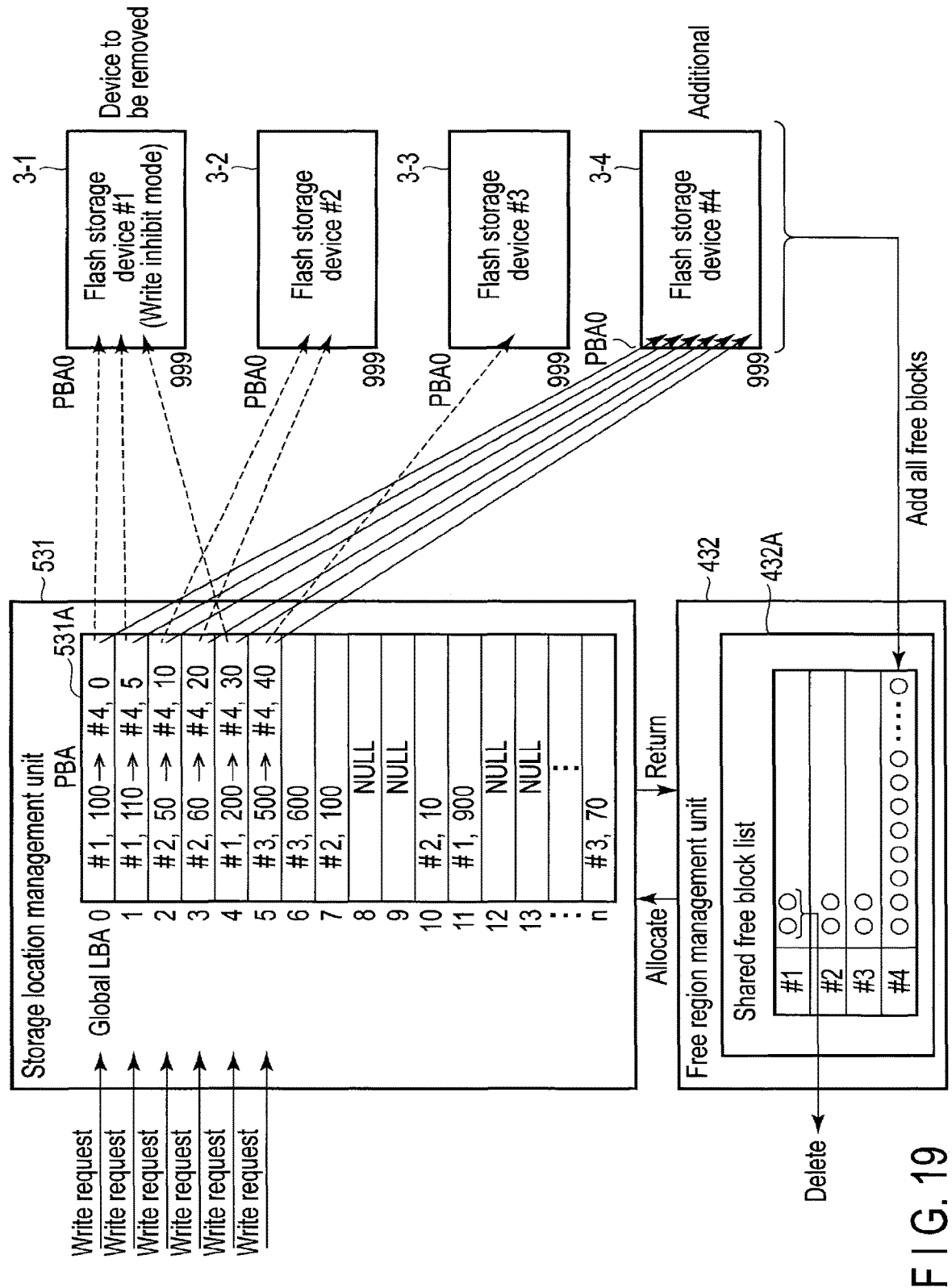
FIG. 19 is a block diagram illustrating a procedure of writing each of data portions corresponding to the respective logical addresses (global LBAs) to any physical storage location in any storage device selected from storage devices (#2 and #3) other than a storage device (#1) determined to be removed and an additional storage device (#4).

FIG. 19 illustrates a procedure of writing each of the data portions corresponding to the respective global LBAs to any physical storage location in a free region in any flash storage device selected from the flash storage devices 3-2 and 3-3 other than the flash storage device 3-1, and the additional flash storage device 3-4.

When the additional flash storage device 3-4 is connected to the host side storage controller 43, the entry corresponding to the flash storage device 3-4 is added to the shared free block list 432A. Then, a list of all of the free blocks in the NAND flash memory of the flash storage device 3-4 is added to the entry corresponding to the flash storage device 3-4. The shared free block list 432A may manage block addresses for identifying the respective free blocks included in each of the flash storage devices.

In FIG. 19, each of the write requests to request writing (overwriting) the update data portions to the respective global LBA0 to global LBA5 where the data portions are already written is sent from the host software to the host side storage controller 43.

When the storage location management unit 531 receives the write request to request writing the data portion to the global LBA0 from the host software, the storage location management unit 531 writes the data portion associated with the received write request to, for example, PBA0 in the free region of the flash storage device 3-4. Then, the storage location management unit 531 updates the LUT entry corresponding to the global LBA0 and changes the physical address mapped to the global LBA0 from (device ID=#1, device PBA=100) to (device ID=#4, device PBA=0). Furthermore, the storage location management unit 531 may send a command (trim command) to invalidate the data portion of the device PBA=100 to the flash storage device 3-1.

Since the flash storage device 3-1 is in the write inhibit mode, the free region of the flash storage device 3-1 does not need to be increased and, therefore, the trim command may be sent or may not be sent to the flash storage device 3-1.

When the storage location management unit 531 receives the write request to request writing the data portion to the global LBA1 from the host software, the storage location management unit 531 writes the data portion associated with the received write request to, for example, PEAS in the free region of the flash storage device 3-4. Then, the storage location management unit 431 updates the LUT entry corresponding to the global LBA1 and changes the physical address mapped to the global LBA1 from (device ID=#1, device PBA=110) to (device ID=#4, device PBA=5). Furthermore, the storage location management unit 531 may send a trim command to invalidate the data portion of the device PBA=110 to the flash storage device 3-1.

When the storage location management unit 531 receives the write request to request writing the data portion to the global LBA2 from the host software, the storage location management unit 531 writes the data portion associated with the received write request to, for example, PBA10 in the free region of the flash storage device 3-4. Then, the storage location management unit 531 updates the LUT entry corresponding to the global LBA2 and changes the physical address mapped to the global LBA2 from (device ID=#2, device PBA=50) to (device ID=#4, device PBA=10). Furthermore, the storage location management unit 531 sends a trim command to invalidate the data portion of the device PBA=50 to the flash storage device 3-2. The free region of the flash storage device 3-2 can be thereby increased easily.

When the storage location management unit 531 receives the write request to request writing the data portion to the global LBA3 from the host software, the storage location management unit 531 writes the data portion associated with the received write request to, for example, PBA20 in the free region of the flash storage device 3-4. Then, the storage location management unit 531 updates the LUT entry corresponding to the global LBA3 and changes the physical address mapped to the global LBA3 from (device ID=#2, device PBA=60) to (device ID=#4, device PBA=20). Furthermore, the storage location management unit 531 sends a trim command to invalidate the data portion of the device PBA=60 to the flash storage device 3-2.

When the storage location management unit 531 receives the write request to request writing the data portion to the global LBA4 from the host software, the storage location management unit 531 writes the data portion associated with the received write request to, for example, PBA30 in the free region of the flash storage device 3-4. Then, the storage location management unit 531 updates the LUT entry corresponding to the global LBA4 and changes the physical address mapped to the global LBA4 from (device ID=#1, device PBA=200) to (device ID=#4, device PBA=30). Furthermore, the storage location management unit 531 may send a trim command to invalidate the data portion of the device PBA=200 to the flash storage device 3-1.

When the storage location management unit 531 receives the write request to request writing the data portion to the global LBA5 from the host software, the storage location management unit 531 writes the data portion associated with the received write request to, for example, PBA40 in the free region of the flash storage device 3-4. Then, the storage location management unit 531 updates the LUT entry corresponding to the global LBA5 and changes the physical address mapped to the global LBA5 from (device ID=#3, device PBA=500) to (device ID=#4, device PBA=40). Furthermore, the storage location management unit 531 may send a trim command to invalidate the data portion of the device PBA=500 to the flash storage device 3-3.

As explained above, according to the embodiments, when it is determined that the flash storage device 3-1 of the flash storage devices 3-1 to 3-3 is to be removed from the host 2 and the flash storage device 3-4 is connected to the host side storage controller 43, the flash storage device 3-1 is controlled in the first mode in which the data write is inhibited and the data read is permitted. Furthermore, (1) first processing of writing each of the update data portions corresponding to the respective data portions already written to the flash storage device 3-1 to any flash storage device selected from the flash storage devices 3-2 and 3-3 and the additional flash storage device 3-4, and (2) second processing of writing each of the update data portions corresponding to the respective data portions already written to the flash storage devices 3-2 and 3-3 to any flash storage device selected from the flash storage devices 3-2 and 3-3 and the additional flash storage device 3-4, are executed. Thus, the capacity corresponding to a number of free blocks included in the NAND flash memory of the additional flash storage device 3-4 can be used efficiently as the over-provisioning region of the whole storage system comprising the flash storage devices 3-1 to 3-4, by adopting the configuration of not fixedly mapping a specific global LBA range to each of the flash storage devices but writing the data portion (update data portion) corresponding to any global LBA to any flash storage device selected from the flash storage devices 3-2 and 3-3 and the additional flash storage device 3-4. For this reason, since the processing of writing the data to the flash storage devices 3-2 to 3-4 can be executed in a state in which the amount of the over-provisioning region of the whole storage system is increased, the data stored in the flash storage device 3-1 can be moved to the other flash storage device without causing reduction in the writing performance of the whole storage system seen from the host 2 and reduction in the writing performance of the whole storage system seen from the application/end user. As a result, the writing performance of the whole storage system can be improved.

In the embodiments, three flash storage devices 3-1 to 3-3 are used in the general state, but the number of flash storage devices used in the general state is not limited to three but any number more than two, of flash storage devices may be used.

In addition, in the embodiments, the host side storage controller 43 controls the flash storage devices each of which comprises both the controller and the nonvolatile memory. However, the host side storage controller 43 can be configured to control the storage units each of which comprises both the printed circuit board and the nonvolatile memory disposed on the printed circuit board and each comprising no controller. In this case, the host side storage controller 43 may manage mapping between each of the global LBAs and each of the physical addresses indicative of the physical storage locations in the storage units where the data portions corresponding to the global LBAs are stored.

In addition, in the embodiments, a NAND flash memory is exemplified as a nonvolatile memory. However, the functions of the present embodiment are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system, comprising:
a plurality of storage devices each including a nonvolatile memory; and
a storage controller configured to:
write each of data portions corresponding to logical addresses belonging to a first logical address space to any storage device selected from the plurality of storage devices, in accordance with write requests received from a host;
manage mapping between the logical addresses and addresses indicative of storage locations in the storage devices to which the data portions are written, by using an address translation table; and
when it is determined that a first storage device of the plurality of storage devices is to be removed and an additional storage device including a nonvolatile memory is connected to the storage controller:
control the first storage device in a first mode in which data write is inhibited and data read is permitted;
execute, in response to receiving, from the host, first subsequent write requests designating first logical addresses corresponding to data portions already written to the first storage device, first processing of writing first update data portions corresponding to the data portions already written to the first storage device, to any storage device selected from the additional storage device and remaining one or more storage devices of the plurality of storage devices except for the first storage device, without writing the first update data portions to the first storage device, and update the address translation table such that addresses indicative of storage locations mapped to the first logical addresses are changed from addresses indicative of storage locations in the first storage device to addresses indicative of storage locations in the any storage device of the plurality of storage devices to which the first update data portions are written; and
execute, in response to receiving, from the host, second subsequent write requests designating second logical addresses corresponding to data portions already written to the remaining one or more storage devices of the plurality of storage devices, second processing of writing second update data portions corresponding to the data portions already written to the remaining one or more storage devices, to any storage device selected from the remaining one or more storage devices and the additional storage device, and update the address translation table such that addresses indicative of storage locations mapped to the second logical addresses are changed from addresses indicative of storage locations in the remaining one or more storage devices to addresses indicative of storage locations in the any storage device to which the second update data portions are written.

2. The information processing system of claim 1, wherein the storage controller is configured to copy valid data in the first storage device to any storage device selected from the remaining one or more storage and the additional storage device, when an amount of the valid data in the first storage device is decreased to be below a threshold value by the first processing.

3. The information processing system of claim 1, wherein the first storage device is configured to execute a refresh operation in a period in which the first storage device is in the first mode, the refresh operation including (i) an operation of detecting blocks where data having an error bit count over a threshold value is stored, among blocks included in a nonvolatile memory in the first storage device, and (ii) an operation of requesting the storage controller to copy valid data in each of the detected blocks, and
the storage controller is configured to copy the valid data in each of the detected blocks to any storage device selected from the remaining one or more storage devices and the additional storage device, in response to reception of the request from the first storage device.

4. The information processing system of claim 3, wherein the storage controller is configured to send a write command including a logical address in the first logical address space corresponding to a data portion to be written, to any storage device selected from the plurality of storage devices, and
the first storage device is configured to send information indicative of a logical address in the first logical address space corresponding to the valid data in each of the detected blocks, to the storage controller.

5. The information processing system of claim 1, wherein the storage controller is configured to drive an indicator configured to indicate that the first storage device is removable, when an amount of valid data in the first storage device has become zero and the first storage device becomes removable.

6. The information processing system of claim 1, wherein
the storage controller is configured to send, when an update data portion corresponding to data portion already written to one storage device of the remaining one or more storage devices is written to other storage device of the remaining one or more storage devices or the additional storage device by the second processing, a command to invalidate the data portion to the one storage device.

7. The information processing system of claim 1, wherein the storage controller manages mapping between the logical addresses and local logical addresses indicative of logical storage locations in a storage system comprising the plurality of storage devices and the additional storage device, by using the address translation table, and
each of the local logical addresses includes of an identifier of a storage device in the storage system and a logical address within a logical address range for the storage device.

8. The information processing system of claim 1, wherein the storage controller manages mapping between the logical addresses and physical addresses indicative of physical storage locations in a storage system comprising the plurality of storage devices and the additional storage device, by using the address translation table, and each of the physical addresses includes an identifier of a storage device in the storage system and a physical address indicative of a physical storage location of a nonvolatile memory in the storage device.

9. The information processing system of claim 1, wherein the storage controller is configured to:
manage free blocks included in each of nonvolatile memories of the plurality of storage devices as a set of shared free blocks shared by the plurality of storage devices; and
when it is determined that the first storage device is to be removed and the additional storage device is connected to the storage controller, delete each of the free blocks of the first storage device from the set of the shared free blocks and add all of free blocks of the additional storage device to the set of the shared free blocks.

10. The information processing system of claim 1, wherein
the storage controller is configured to send to the first storage device an erase command for instructing to perform erase operations on each of blocks in a nonvolatile memory of the first storage device, when an amount of valid data in the first storage device has become zero.

11. The information processing system of claim 10, wherein
the storage controller is configured to write predetermined data to each of the blocks where the erase operation is executed.

12. The information processing system of claim 1, wherein
the storage controller is configured to:
manage mapping between the logical addresses and physical addresses indicative of physical storage locations in a storage system comprising the plurality of storage devices and the additional storage device, by using the address translation table; and
every time one of blocks of a nonvolatile memory in the first storage device becomes a block including no valid data by the first processing, send to the first storage device an erase command for instructing to perform an erase operation on the block including no valid data.

13. The information processing system of claim 12, wherein
the storage controller is configured to write, every time the erase operation on the block of the nonvolatile memory in the first storage device is executed, predetermined data to the block where the erase operation is executed.

14. An information processing system, comprising:
a plurality of storage devices each including a nonvolatile memory; and
a storage controller configured to:
write each of data portions corresponding to logical addresses belonging to a first logical address space to any storage device selected from the plurality of storage devices, in accordance with write requests received from a host;
manage mapping between the logical addresses and addresses indicative of storage locations in the storage devices to which the data portions are written, by using an address translation table; and
when it is determined that a first storage device of the plurality of storage devices is to be removed and an additional storage device of the plurality of storage devices is connected to the storage controller:
control the first storage device in a first mode in which data write is inhibited and data read is permitted;
execute, in response to receiving, from the host, first subsequent write requests designating first logical addresses corresponding to data portions already written to the first storage device, first processing of writing first update data portions corresponding to the data portions already written to the first storage device, to the additional storage device, without writing the first update data portions to the first storage device, and update the address translation table such that addresses indicative of storage locations mapped to the first logical addresses are changed from addresses indicative of storage locations in the first storage device to addresses indicative of storage locations in the additional storage device to which the first update data portions are written;
execute, in response to receiving, from the host, second subsequent write requests designating second logical addresses corresponding to data portions already written to remaining one or more storage devices of the plurality of storage devices except for the first storage device, second processing of writing second update data portions corresponding to the data portions already written to the remaining one or more storage devices, to the additional storage device, and update the address translation table such that addresses indicative of storage locations mapped to the second logical addresses are changed from addresses indicative of storage locations in the remaining one or more storage devices to addresses indicative of storage locations in the additional storage device to which the second update data portions are written; and
after free regions are allocated in the remaining one or more storage devices by the second write processing, execute, in response to receiving, from the host, further subsequent write requests, the further subsequent write requests including write requests designating third logical addresses corresponding to data portions already written to the first storage device and write requests designating fourth logical addresses corresponding to data portions already written to the remaining one or more storage devices, third processing of writing third update data portions corresponding to the data portions already written to the first storage device and fourth update data portions corresponding to data portions already written to the remaining one or more storage devices, to the remaining one or more storage devices, and update the address translation table such that addresses indicative of storage locations mapped to the third logical addresses and addresses indicative of storage locations mapped to the fourth logical addresses are changed to addresses indicative of storage locations in the remaining one or more storage devices to which the third update data portions and the fourth update data portions are written.

15. The information processing system of claim 14, wherein
the storage controller is configured to copy valid data in the first storage device to any storage device selected from the remaining one or more storage devices and the additional storage device, when an amount of the valid data in the first storage device is decreased to be below a threshold value by the first processing and the second processing.

16. The information processing system of claim 14, wherein
the first storage device is configured to execute a refresh operation in a period in which the first storage device is in the first mode, the refresh operation including (i) an operation of detecting each of blocks where data having an error bit count over a threshold value is stored, among blocks included in a nonvolatile memory in the first storage device, and (ii) an operation of requesting the storage controller to copy valid data in each of the detected blocks, and
the storage controller is configured to copy the valid data in each of the detected blocks to any storage device selected from the remaining one or more storage devices and the additional storage device, in response to reception of the request from the first storage device.

* * * * *